US010882270B2

(12) United States Patent
Kohler

(10) Patent No.: US 10,882,270 B2
(45) Date of Patent: *Jan. 5, 2021

(54) APPARATUS FOR FLUTING A WEB IN THE MACHINE DIRECTION

(71) Applicant: HBK Family, LLC, Uniontown, OH (US)

(72) Inventor: Herbert B. Kohler, Uniontown, OH (US)

(73) Assignee: HBK FAMILY, LLC, Uniontown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,617

(22) Filed: Oct. 14, 2019

(65) Prior Publication Data

US 2020/0039172 A1   Feb. 6, 2020

Related U.S. Application Data

(63) Continuation of application No. 15/969,819, filed on May 3, 2018, now Pat. No. 10,479,043, which is a (Continued)

(51) Int. Cl.
*B31F 1/22* (2006.01)
*B29D 16/00* (2006.01)

(52) U.S. Cl.
CPC ............... *B31F 1/22* (2013.01); *B29D 16/00* (2013.01); *B31F 1/225* (2013.01); *Y10T 156/101* (2015.01); *Y10T 156/1008* (2015.01)

(58) Field of Classification Search
CPC ................................. B31F 1/22; B31F 1/225
See application file for complete search history.

(56) References Cited

U.S. PATENT DOCUMENTS 654,884 A   7/1900 Ferres et al.
739,276 A   9/1903 Allen
(Continued)

FOREIGN PATENT DOCUMENTS

CA   1072873 A   3/1980
DE   159213 C   9/1903
(Continued)

OTHER PUBLICATIONS

Daub, E. et al., "Gluing corrugated medium and linerboard together on the corrugator," Tappi Journal, pp. 171-178, Jun. 1990.
(Continued)

*Primary Examiner* — Barbara J Musser
(74) *Attorney, Agent, or Firm* — Pearne & Gordon LLP

(57) ABSTRACT

A forming device for gathering the width of a traveling web is disclosed. The forming device includes opposing arrays of flute-forming bars that can be interlaced to define therebetween a longitudinal flute-forming labyrinth effective to reduce the width of a web traveling therethrough by a preselected take-up ratio. The flute-forming bars are curved beginning at an entry end of the forming device such that they converge in a lateral direction as they proceed in the machine direction. In this manner, individual elements of the web traveling between the respective arrays in the machine direction follow contour lines along the curved bars or between adjacent ones of the curved bars so that no such element crosses any flute-forming bar in the cross-machine direction as the web travels and is fluted. A corrugating die for introducing a near-net shape to the intermediate-fluted web is also disclosed, as are a corrugating line incorporating these operations and methods for its operation.

13 Claims, 14 Drawing Sheets

Related U.S. Application Data continuation of application No. 15/098,591, filed on Apr. 14, 2016, now Pat. No. 9,981,441, which is a continuation of application No. 14/271,206, filed on May 6, 2014, now Pat. No. 9,346,236, which is a continuation of application No. 14/067,783, filed on Oct. 30, 2013, now Pat. No. 8,771,579.

(60) Provisional application No. 61/721,079, filed on Nov. 1, 2012.

(56) References Cited

U.S. PATENT DOCUMENTS

| | | |
|---|---|---|
| 1,199,508 A | 9/1916 | Swift et al. |
| 1,627,966 A | 5/1927 | Goodlett |
| 1,834,648 A | 12/1931 | Saunders |
| 1,848,583 A | 3/1932 | Swift, Jr. |
| 1,981,338 A | 11/1934 | Swift et al. |
| RE20,970 E | 1/1939 | Rowe et al. |
| 2,163,063 A | 6/1939 | Romanoff |
| 2,236,932 A | 4/1941 | Arentsen |
| 2,257,429 A | 9/1941 | Ruegenberg |
| 2,398,844 A | 4/1946 | Muggleton et al. |
| 2,494,431 A | 1/1950 | Eckstein |
| 2,622,558 A | 12/1952 | Mikkelsen |
| 2,793,676 A | 5/1957 | Hubmeier |
| 2,960,145 A | 11/1960 | Ruegenberg |
| 3,002,876 A | 10/1961 | Rosati |
| 3,024,496 A | 3/1962 | Colombo |
| 3,026,231 A | 3/1962 | Chavannes |
| 3,046,935 A | 7/1962 | Wilson |
| 3,077,222 A | 2/1963 | Shanley |
| 3,178,494 A | 4/1965 | Tisdale |
| 3,245,121 A | 4/1966 | Graff |
| 3,300,359 A | 1/1967 | Nikkei |
| 3,303,814 A | 2/1967 | Nitchie |
| 3,306,805 A | 2/1967 | Klein et al. |
| 3,383,234 A | 5/1968 | Nikkei |
| 3,425,888 A | 2/1969 | Kellioutt |
| 3,479,240 A | 11/1969 | Moser |
| 3,560,310 A | 2/1971 | Bolton |
| 3,648,913 A | 3/1972 | Ferara |
| 3,676,247 A | 7/1972 | Morris et al. |
| 3,676,263 A | 7/1972 | Tisdale et al. |
| 3,692,615 A | 9/1972 | Ohmori et al. |
| 3,700,518 A | 10/1972 | Ohmori |
| 3,738,905 A | 6/1973 | Thomas |
| 3,773,587 A | 11/1973 | Flewwelling |
| 3,788,515 A | 1/1974 | Middleman |
| 3,892,613 A | 7/1975 | McDonald et al. |
| 3,966,518 A | 6/1976 | Ferara et al. |
| 3,981,758 A | 9/1976 | Thayer et al. |
| 3,993,425 A | 11/1976 | Dunn et al. |
| 4,086,116 A | 4/1978 | Yazaki et al. |
| 4,104,107 A | 8/1978 | Christensen |
| 4,128,677 A | 12/1978 | Hoelzinger |
| 4,134,781 A | 1/1979 | Carstens et al. |
| 4,155,884 A | 5/1979 | Hughes |
| 4,170,347 A | 10/1979 | Lewis |
| 4,177,102 A | 12/1979 | Tokuno |
| 4,179,253 A | 12/1979 | Lightfoot |
| 4,267,008 A | 5/1981 | Owens |
| 4,282,998 A | 8/1981 | Peekna |
| 4,306,932 A | 12/1981 | Bradatsch et al. |
| 4,316,428 A | 2/1982 | Flaum et al. |
| 4,316,755 A | 2/1982 | Flaum et al. |
| 4,338,154 A | 7/1982 | Berthelot et al. |
| 4,344,379 A | 8/1982 | Roberts |
| 4,351,264 A | 9/1982 | Flaum et al. |
| 4,453,465 A | 6/1984 | Heller et al. |
| 4,498,949 A | 2/1985 | Soennichsen |
| 4,544,436 A | 10/1985 | Itoh et al. |
| 4,569,864 A | 2/1986 | McIntyre |
| 4,589,944 A | 5/1986 | Torti et al. |
| 4,603,654 A | 8/1986 | Mori et al. |
| 4,757,782 A | 7/1988 | Pullinen |
| 4,764,236 A | 8/1988 | Nikkei |
| 4,806,183 A | 2/1989 | Williams |
| 4,841,317 A | 6/1989 | Westell |
| 4,863,087 A | 9/1989 | Kohler |
| 4,871,593 A | 10/1989 | McIntyre |
| 4,879,949 A | 11/1989 | Vennike |
| 4,886,563 A | 12/1989 | Bennett et al. |
| 4,935,082 A | 6/1990 | Bennett et al. |
| 4,991,787 A | 2/1991 | Berg |
| 5,016,801 A | 5/1991 | Gilat et al. |
| 5,037,665 A | 8/1991 | LaMantia et al. |
| 5,048,453 A | 9/1991 | Eriksson |
| 5,103,732 A | 4/1992 | Wells et al. |
| 5,185,052 A | 2/1993 | Chappell et al. |
| 5,203,935 A | 4/1993 | May et al. |
| 5,226,577 A | 7/1993 | Kohler |
| 5,242,525 A | 9/1993 | Biagiotti |
| 5,246,497 A | 9/1993 | Rantanen |
| 5,275,657 A | 1/1994 | Duffy et al. |
| 5,362,346 A | 11/1994 | Bullock, Sr. |
| 5,423,468 A | 6/1995 | Liedtke |
| 5,503,547 A | 4/1996 | Funahashi et al. |
| 5,508,083 A | 4/1996 | Chapman, Jr. |
| 5,609,293 A | 3/1997 | Wu |
| 5,656,124 A | 8/1997 | Krayenhagen et al. |
| 5,660,631 A | 8/1997 | Eriksson |
| 5,783,006 A | 7/1998 | Klockenkemper et al. |
| 5,785,802 A | 7/1998 | Seki et al. |
| 5,792,487 A | 8/1998 | Wenning et al. |
| 5,947,885 A | 9/1999 | Paterson |
| 6,051,068 A | 4/2000 | Kohl et al. |
| 6,058,844 A | 5/2000 | Niemiec |
| 6,068,701 A | 5/2000 | Kohler et al. |
| 6,098,687 A | 8/2000 | Ishibuchi et al. |
| 6,126,750 A | 10/2000 | Seiz et al. |
| 6,136,417 A | 10/2000 | Ishibuchi et al. |
| 6,143,113 A | 11/2000 | Berube |
| 6,155,319 A | 12/2000 | Giugliano et al. |
| 6,257,520 B1 | 7/2001 | Fujikura |
| 6,364,247 B1 | 4/2002 | Polkinghorne |
| 6,378,273 B1 | 4/2002 | Trani |
| 6,418,851 B1 | 7/2002 | Hartmann et al. |
| 6,470,294 B1 | 10/2002 | Taylor |
| 6,575,399 B1 | 6/2003 | Lamothe |
| 6,595,465 B2 | 7/2003 | Lamothe |
| 6,602,546 B1 | 8/2003 | Kohler |
| 6,620,240 B2 | 9/2003 | Choi et al. |
| 6,620,455 B2 | 9/2003 | Mensing et al. |
| 6,635,111 B1 | 10/2003 | Holtmann et al. |
| 6,692,602 B1 | 2/2004 | Mensing et al. |
| 6,800,052 B1 | 10/2004 | Abe |
| 7,115,089 B2 | 10/2006 | Basily et al. |
| 7,267,153 B2 | 9/2007 | Kohler |
| 7,595,086 B2 | 9/2009 | Kohler |
| 7,691,045 B2 | 4/2010 | Basily et al. |
| 7,717,148 B2 | 5/2010 | Kohler |
| 7,758,487 B2 | 7/2010 | Elsayed et al. |
| 8,057,621 B2 | 11/2011 | Kohler |
| 8,398,802 B2 | 3/2013 | Kohler |
| 8,475,350 B2 | 7/2013 | Basily et al. |
| 8,771,579 B2 | 7/2014 | Kohler |
| 9,005,096 B2 | 4/2015 | Kling |
| 2002/0149866 A1 | 10/2002 | Kato et al. |
| 2003/0178524 A1 | 9/2003 | Newman et al. |
| 2003/0192902 A1 | 10/2003 | Sosalla et al. |
| 2004/0241328 A1 | 12/2004 | Bradatsch et al. |
| 2005/0006816 A1 | 1/2005 | Drut et al. |
| 2005/0194088 A1 | 9/2005 | Kohler |
| 2007/0138698 A1 | 6/2007 | Gerndt et al. |
| 2008/0317940 A1 | 12/2008 | Kohler |
| 2009/0325772 A1 | 12/2009 | Basily et al. |
| 2010/0181015 A1 | 7/2010 | Kohler |

(56) References Cited

U.S. PATENT DOCUMENTS

| | | |
|---|---|---|
| 2010/0331160 A1 | 12/2010 | Kohler |
| 2014/0239548 A1 | 8/2014 | Kohler |

FOREIGN PATENT DOCUMENTS

| | | |
|---|---|---|
| DE | 595275 C | 4/1934 |
| DE | 4018426 A1 | 12/1991 |
| EP | 0037332 A1 | 10/1981 |
| EP | 1199151 A2 | 4/2002 |
| EP | 1199152 A2 | 4/2002 |
| EP | 0825017 A1 | 7/2002 |
| FR | 335445 A | 1/1904 |
| GB | 199538 A | 6/1923 |
| GB | 1544634 A | 4/1979 |
| GB | 2039559 A | 8/1980 |
| JP | S40023188 Y | 8/1965 |
| JP | S42004916 B | 2/1967 |
| JP | S48029595 A | 4/1973 |
| JP | S48021676 B | 6/1973 |
| JP | 52148396 | 12/1977 |
| JP | S52156090 A | 12/1977 |
| JP | S53010833 U | 1/1978 |
| JP | S56160832 U | 11/1981 |
| JP | H01228572 A1 | 9/1989 |
| JP | H10034776 | 2/1998 |
| JP | 2000202930 A | 7/2000 |
| JP | 2001063918 A | 3/2001 |
| JP | 2002192637 A | 7/2002 |
| JP | 2005193504 A | 7/2005 |
| JP | 2005334053 A | 12/2005 |
| JP | 2009209440 A | 9/2009 |
| JP | 2011515246 A | 5/2011 |
| RU | 2118217 C1 | 11/1981 |
| SU | 1468766 A1 | 3/1989 |
| SU | 1805605 A1 | 7/1996 |
| WO | 9947347 A1 | 9/1999 |
| WO | 200244635 A2 | 6/2002 |
| WO | 2013063551 A2 | 5/2013 |

OTHER PUBLICATIONS

Eltex Elektrostatik GmbH, "Webmoister 70RX" Presentation.

Inoue, M. et al., "Kinetics of gelatinization of cornstarch adhesive," J. Applied Polymer Sci., vol. 31, pp. 2779-2789, 1986.

Institute of Paper Chemistry, "Development of a Cold Corrugating Process," Contract No. DE-AC02-79CS40211, Appleton, WI, Dec. 15, 1981.

International Search Report and Written Opinion from PCT Application Serial No. PCT/US2013/067598.

Janes, R.L., "A Study of Adhesion in the Cellulose-Starch-Cellulose System," Institute of Paper Chemistry, Appleton, WI, Jun. 1968.

Kroeschell, W.O., "Bonding on the corrugator," Tappi Journal, pp. 69-74, Feb. 1990.

Office of Industrial Technologies, Energy Efficiency and Renewable Energy, U.S. Department of Energy, "Forest Products Project Fact Sheet—Linear Corrugating," Order #1-FP-723, Jan. 2002.

Ononokpono, O.E. et al., "The influence of binder film thickness on the mechanical properties of binder films in tension," J. Pharm Pharmacol, pp. 126-128, Feb. 1988.

Page from a brochure for the Marquip Pyrobond Singlefacer.

Printco Industries, LLC, "Chambered Reverse Angle Doctor Blade System," retrieved from www.printco-industries.com on Sep. 25, 2009.

Shaw, N.W. et al., "Xitex—a revolution in board design and manufacture," Tappi Journal 1997 Corrugated Containers Conference Proceedings.

Sprague, C.H., "Development of a Cold Corrugating Process Final Report," Institute of Paper Chemistry, Appleton, WI, May 1985.

Whitsitt, W.J. et al., "High Speed Runnability and Bonding: Effects of Medium and Corrugator Conditions on Board Quality," Institute of Paper Chemistry, Appleton, WI, May 1, 1989.

Search Report issued in EP application No. 13 851 187.8 dated Dec. 1, 2015, 2 pages.

European Search Report issued in European Patent Application No. 17176993.8 dated Oct. 6, 2017, 5 pages.

Office action issued in corresponding European Patent Application No. 17176993.8 dated Jul. 5, 2018, 5 pages.

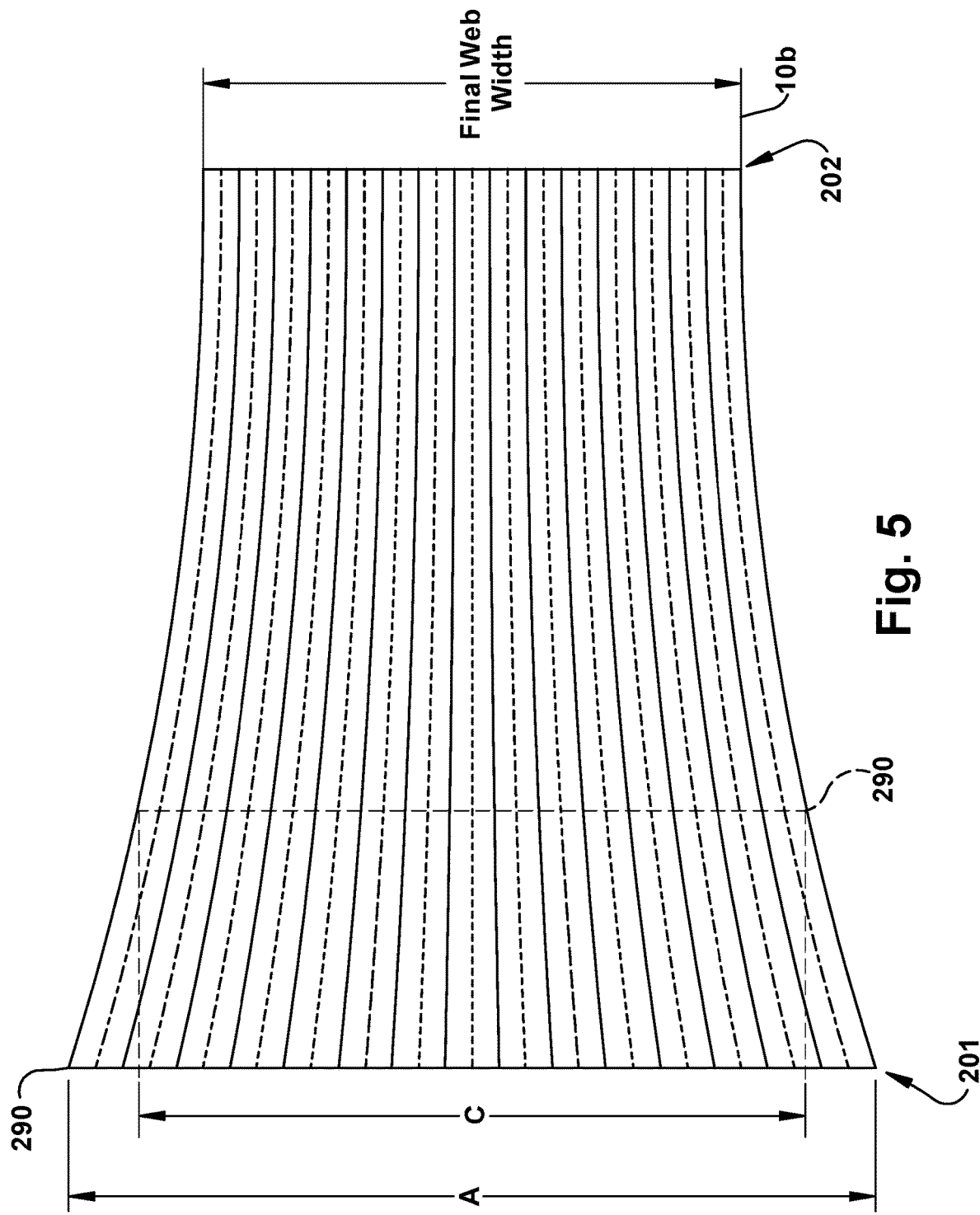

APPARATUS FOR FLUTING A WEB IN THE MACHINE DIRECTION

CROSS-REFERENCE TO RELATED APPLICATIONS

This application is a continuation of U.S. application Ser. No. 15/969,819 filed May 3, 2018, now U.S. Pat. No. 10,479,043, which is a continuation of U.S. application Ser. No. 15/098,591 filed Apr. 14, 2016, now U.S. Pat. No. 9,981,441, which is a continuation of U.S. application Ser. No. 14/271,206 filed May 6, 2014, now U.S. Pat. No. 9,346,236, which is a continuation of U.S. application Ser. No. 14/067,783 filed Oct. 30, 2013, now U.S. Pat. No. 8,771,579, which claims the benefit of U.S. Provisional Patent Application Ser. No. 61/721,079 filed Nov. 1, 2012, all of which are incorporated herein by reference.

BACKGROUND

Corrugated webs possess increased strength and dimensional stability compared to un-corrugated (i.e. flat) webs of the same material. For example, corrugated paperboard or cardboard is widely used in storage and shipping boxes and other packaging materials to impart strength. A typical corrugated cardboard structure known as 'double-wall' includes a corrugated paperboard web sandwiched between opposing un-corrugated paperboard webs referred to as 'liners.' The opposing liners are adhered to opposite surfaces of the corrugated web to produce a composite corrugated structure, typically by gluing each liner to the adjacent flute crests of the corrugated web. This structure is manufactured initially in planar composite boards, which can then be cut, folded, glued or otherwise formed into a desired configuration to produce a box or other form for packaging.

Corrugated webs such as paperboard are formed in a corrugating machine starting from flat webs. A conventional corrugating machine feeds the flat web through a nip between a pair of corrugating rollers rotating on axes that are perpendicular to the direction of travel of the web when viewed from above. Each of the corrugating rollers has a plurality of longitudinally-extending ribs defining alternating peaks and valleys distributed about the circumference and extending the length of the roller. The rollers are arranged so that their respective ribs interlock at the nip, with the ribs of one roller being received within the valleys of the adjacent roller. The interlocking ribs define a corrugating labyrinth through which the web travels as it traverses the nip. As the web is drawn through the corrugating labyrinth it is forced to conform to the configuration thereof, thus introducing into the web flutes or corrugations that approximate the dimensions of the pathway through the corrugating labyrinth. Accordingly, it will be appreciated that in a conventional corrugating machine flutes are introduced into the web along a direction that is transverse to the web-travel pathway; i.e. the flutes extend in a transverse (cross-machine) direction relative to the direction of travel of the web (machine direction). More simply, conventionally the flutes extend along the width of the web between its lateral edges. An example of this conventional methodology is shown in U.S. Pat. No. 8,057,621 (see FIGS. 7 and 7a thereof), which is incorporated herein by reference.

Corrugating a web in this manner can damage the paperboard or other web material because it introduces a substantial amount of oscillatory frictional and tension forces to the web leading into and while traversing the corrugating nip. Briefly, as the web is drawn between the corrugating rollers and forced to negotiate the corrugating labyrinth, the tension of the web, as well as compressive stresses normal to the plane of the entering web, oscillate in magnitude and direction as successive flutes are formed due to the reciprocating motion of the corrugating ribs relative to the web, and due to roll and draw variations in the web through the labyrinth as it is being corrugated. The oscillatory nature of the web tension through a corrugating labyrinth between corrugating rollers is well documented; see, e.g., Clyde H. Sprague, *Development of a Cold Corrugating Process Final Report*, The Institute of Paper Chemistry, Appleton, Wis., Section 2, p. 45, 1985. The resulting substantial cyclic peaks in web tension typically produce some structural damage in the web as it is corrugated.

In addition to undesirable tension effects, corrugating the web in the cross-machine direction introduces flutes that extend transverse to the fibers of the paperboard, which typically run the length of the web in the machine direction. Thus, flutes formed in a cross-machine direction must re-orient and introduce undulations into the paper fibers, which can also lead to reduced strength.

One way to address the aforementioned problems would be to corrugate the web in the machine direction so that the flutes extend along the direction of the web-travel pathway; i.e. in the longitudinal direction of the web itself. This is commonly referred to as 'longitudinal corrugating' or 'linear corrugating.' One issue with longitudinal corrugating is that as the longitudinally-extending flutes are formed, they necessarily consume web width (i.e. the extent of the web in the lateral, cross-machine direction) in order to convert the initially flat web into one having hills and valleys. In other words, to produce longitudinally-extending flutes the web must be gathered in the cross-machine direction such that its overall width after the flutes are formed is lower than the web width prior to forming the flutes. The ratio of the flat web's original, pre-corrugated width to its post-corrugated width is referred to as the 'take-up ratio.' Take-up ratios are well known for standard flute sizes in conventional transverse corrugating methods. For example, a conventional transversely-corrugated, A-fluted web exhibits a typical take-up ratio of 1.56 because the amplitude and pitch of A-flutes are such that introducing them into the web reduces the web length (i.e. its linear dimension in a direction transverse to the flutes) by 64%; i.e. making the ratio of starting length to ending length equal to 1.56. Stated another way, in conventional corrugating if one wants to end up with 100 yards of transversely-corrugated web, one has to feed 156 yards of flat web to the corrugating machine to account for the web length consumed by introducing the A-flutes.

A similar take-up ratio will be present in linear corrugating except that now that ratio will apply to the web's width in the cross-machine direction instead of to its length. This introduces a special problem because typical linear-corrugating devices such as linear-corrugating rollers cannot simultaneously gather web width and introduce corrugations without damaging and tearing the web. For example, linear corrugating rollers have circumferentially-extending ribs and valleys distributed longitudinally along the length of the rollers, wherein the circumferential ribs of one roller are received within the circumferential valleys of the opposing roller, and vice versa. Unless the web width is condensed sufficiently to account for the take-up ratio of the finished product prior to entering the nip between these rollers, it will be substantially wider than the intended product on entering the nip and would need to be instantaneously and simultaneously gathered and corrugated to produce the desired product. This cannot be achieved without damaging and tearing the web. To solve this problem, the traveling web should be gathered from its initial width to its approximate final width, based on the anticipated take-up ratio, prior to being introduced into the linear-corrugating rollers or other corrugating device.

For this reason, to date carrying out linear corrugating is impractical for commercial applications that require conventional flute sizes (e.g. A-through E-flutes) for useful web widths (e.g. final width of 50 inches). U.S. Pat. No. 7,691,045 (incorporated herein by reference) discloses a machine for gathering a traveling web laterally in the cross-machine direction prior to introducing that web to a set of rollers to introduce a three-dimensional pattern into the web. That machine utilizes a series of opposed rollers disposed along the machine direction for introducing longitudinal folds into the web beginning at the web's center. Each successive set of rollers thereafter introduces two additional folds at either side of the previously-made fold(s) until the entire web consists of a series of longitudinal folds or flutes so that the web's entire width has been gathered to a desired degree. This machine can be effective to gather the width of a paper or other web prior to downstream operations (such as corrugating or other three-dimensional forming) for relatively narrow widths that are not particularly useful on a commercial scale. Unfortunately, however, for commercial widths of, e.g. 50 inches or greater, the number of successive sets of opposed rollers that would be needed to successively form the longitudinal flutes is such that the machine would be impractically long, producing a very large footprint. Accordingly, such a machine is not capable of being retrofitted into existing corrugating lines where space is tight, and for new installations it would take up too much space to be practical.

U.S. Pat. Appl'n Pub. No. 2010/0331160 (incorporated herein by reference), which is commonly assigned with the present application, discloses another machine for gathering the width of a traveling web. That machine utilizes opposing sets of linear flute-forming bars that generally extend in the machine direction, wherein the spacing between adjacent ones of the bars generally decreases along the machine direction. The opposing sets of bars are interlaced such that the traveling web is caused to gradually conform to an intermediate longitudinally-fluted geometry as it passes between the opposing sets of bars by virtue of the decreasing lateral spacing between the bars. This machine has the advantage that it is capable of gathering the width of a traveling web in a relatively short distance of web travel, and is therefore of a practical size and footprint to be retrofitted into existing installations. However, as the paperboard web traverses the labyrinth between the opposing sets of flute-forming bars and is gathered laterally inward, individual paper elements in the web are dragged laterally across the bars thereby introducing position- and time-dependent lateral tension variations and oscillations throughout the web, which are undesirable and may contribute to damage.

It would be desirable to gather the width of a traveling web of material in the cross-machine direction according to a predetermined take-up ratio desirable for downstream processing, while minimizing or eliminating introduction of lateral tension or frictional forces in the web as a result of the gathering operation. The gathered web could then be introduced into downstream processing operations, such as longitudinal corrugating or other operations for introducing three-dimensional structure to the web, which downstream operation(s) will benefit from the lateral take-up ratio introduced in the earlier gathering operation.

SUMMARY OF THE INVENTION

A forming device is disclosed, which has an entry end and an exit end spaced apart along a machine direction. The forming device includes a plurality of flute-forming bars extending from adjacent the entry toward the exit end. At least a subset of the plurality of flute-forming bars are curved such that they converge in a cross-machine direction as they proceed toward the exit end.

A corrugating die is also disclosed, which has an entry end and an exit end spaced apart along a machine direction. The corrugating die has a continuous smooth first forming surface having a first sinus contour viewed in lateral cross-section adjacent the entry end. The first forming surface gradually evolves in the machine direction to a second sinus contour viewed in lateral cross-section adjacent the exit end. The first sinus contour has a larger amplitude and lower frequency than said second sinus contour.

A corrugating line is also disclosed, which includes the aforementioned forming device located upstream along the machine direction of the aforementioned corrugating die. The forming device is configured to deliver from its exit end a formed web of medium material that has been fluted to an intermediate longitudinally-fluted geometry. The corrugating die is configured to receive the formed web and to convert it from the intermediate longitudinally-fluted geometry to a near net shape having a lower-amplitude, higher-frequency fluted geometry that approximates a final desired corrugated geometry.

A method of forming a longitudinally-corrugated web is also disclosed. The method includes the following steps: uniformly introducing into a web of medium material a full-width array of longitudinal flutes of intermediate geometry as the web travels along a web-travel pathway in a machine direction, thereby reducing the width of the web to substantially a final width that corresponds to a take-up ratio for preselected longitudinal corrugations or other three-dimensional structure to be formed in the web at the aforementioned final width, wherein substantially no portion of the web traverses a flute-forming element in a cross-machine direction while introducing the intermediate-geometry flutes therein.

A further method of forming a longitudinally-corrugated web is also disclosed, which includes the following steps: feeding a web of medium material having an initial width in a machine direction through a longitudinal fluting labyrinth defined between opposing sets of at least partially interlaced flute-forming bars, wherein pluralities of the flute-forming bars in each set are curved such that the bars in said respective pluralities converge in a cross-machine direction as they proceed toward an exit end; and reducing the width of the web to a substantially final width by forming longitudinal flutes of intermediate geometry in the web as it passes through the labyrinth, wherein individual elements of the web passing through the labyrinth follow curved contour lines along respective individual ones of the pluralities of flute forming bars from a point where the respective element first contacts the respective bar all the way until the web exits the labyrinth.

A further forming device is disclosed, which has an entry end and an exit end spaced apart along a machine direction, and a plurality of flute-forming bars extending from adjacent the entry end toward the exit end. At least a subset of the plurality of flute-forming bars each has a variable-tangent configuration such that imaginary tangents to each of the subset of bars, at spaced locations along a length thereof, become successively nearer to parallel with the machine direction. In this manner the subset of flute-forming bars converge in a cross-machine direction as they proceed toward the exit end.

BRIEF DESCRIPTION OF DRAWINGS

FIG. 5 is a schematic plan view of both the first and second sets of flute-forming bars as disclosed herein at least partially interlaced with one another. The figure also schematically illustrates gathering web width using the disclosed forming device to accommodate take-up ratios associated with conventional "A" and "C" flutes for longitudinal corrugating.

DETAILED DESCRIPTION OF PREFERRED EMBODIMENTS

Figure 1:
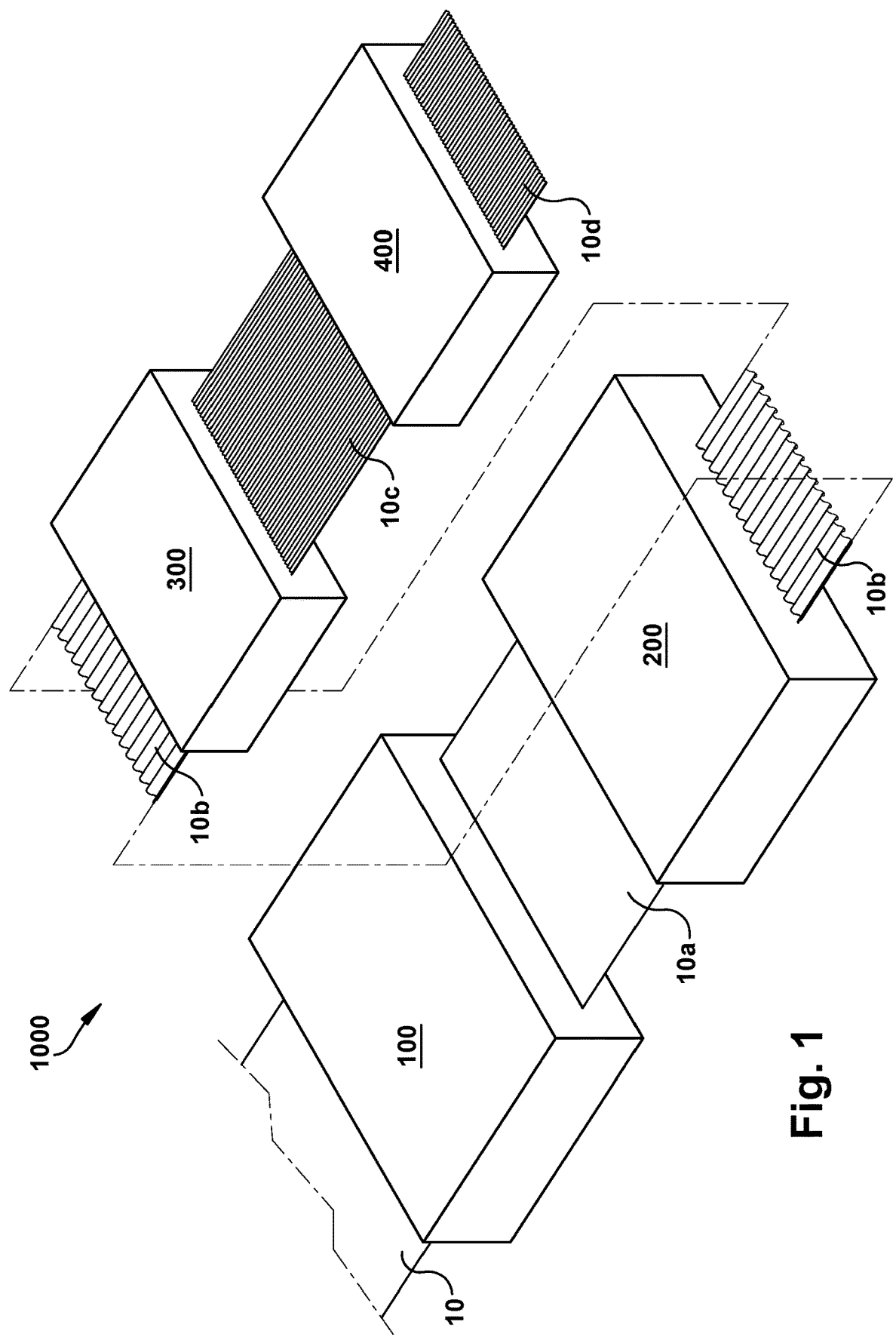
FIG. 1 is a schematic illustration of a longitudinal corrugating line incorporating a forming device and a longitudinal corrugating die as disclosed herein.

FIG. 1 schematically illustrates a longitudinal corrugating line 1000. In the illustrated embodiment the corrugating line 1000 includes, in the machine direction along the web-travel pathway of a web 10 of corrugating medium, a preconditioning apparatus 100, a forming device 200, a corrugating die 300 and a final corrugating apparatus 400. In FIG. 1, a single web 10 of corrugating medium is traveling along the web-travel pathway through the corrugating line 1000 in the machine direction. The web is denoted by reference numerals 10, 10a, 10b, 10c and 10d in FIG. 1, corresponding to different stages in the line 1000 wherein the web has been conditioned or treated or manipulated in different operations as more fully described below.

Briefly, in FIG. 1 the web 10 is initially fed from a source of corrugating medium (e.g. from rolls as is conventional in the art, not shown) to the preconditioning apparatus 100. In the preconditioning apparatus 100, the moisture and/or temperature of the web 10 can be adjusted to be within an optimum range if desired. Thereafter, the conditioned web 10a is fed to a forming device 200. In the forming device 200, the overall width of the traveling web is reduced by gathering the web laterally (in the cross-machine direction) via introduction of longitudinally-extending flutes to produce a formed web 10b of intermediate geometry. The longitudinally-extending flutes in the formed web 10b are of larger amplitude and lower frequency than those of the final corrugated web 10d to be made downstream. By introduction of the intermediate-geometry flutes, the forming device 200 reduces the width in the formed web 10b (in the cross-machine direction) compared to the original web 10 (or conditioned web 10a) by the take-up ratio (or by approximately that ratio) corresponding to the final longitudinal flutes that are to be introduced downstream. Importantly, the overall width of the formed web 10b emerging from the forming device 200 will approximate or be substantially the same as the width of a final corrugated web 10d.

Each of the aforementioned operations will now be described.

Preconditioning Apparatus

Beginning first with the preconditioning apparatus 100, preconditioning is optional and may not be necessary or desirable in every longitudinal corrugating line 1000. Accordingly, the preconditioning apparatus may be omitted. When included, the preconditioning apparatus 100 can be used to introduce or adjust a moisture content in the web 10 prior to its entering the forming device 200. Any conventional or suitable device for providing or adjusting the moisture in the web can be utilized in or as the preconditioning apparatus 100, such as spray nozzles, moisture-application rollers, etc. These will not be described further here, but exemplary moisture-conditioning devices suitable in the preconditioning apparatus are known, for example, from U.S. Pat. No. 8,057,621, incorporated above.

The preconditioning apparatus 100 may also include one or more devices to adjust the temperature of the traveling web 10 into an optimum range for downstream processing. For example, heated rollers and hot plates are conventional in the art and might be used. In some embodiments both moisture and temperature can be adjusted contemporaneously or successively via the preconditioning apparatus 100 in order to precondition the web for downstream operations. For example, it is generally desirable for the traveling web to possess between 6 and 9 weight percent moisture to protect the paper fibers. Heating the web to an elevated temperature (particularly in cold climates) but not sufficiently high to burn or otherwise damage the paper can also help relax paper fibers making them less susceptible to breakage or damage from folding and tension effects introduced in downstream corrugating operations. Both moisture- and temperature-preconditioning operations are described in the aforementioned "621 patent and elsewhere in the literature, and they will not be described further here.

Forming Device

Figure 2:
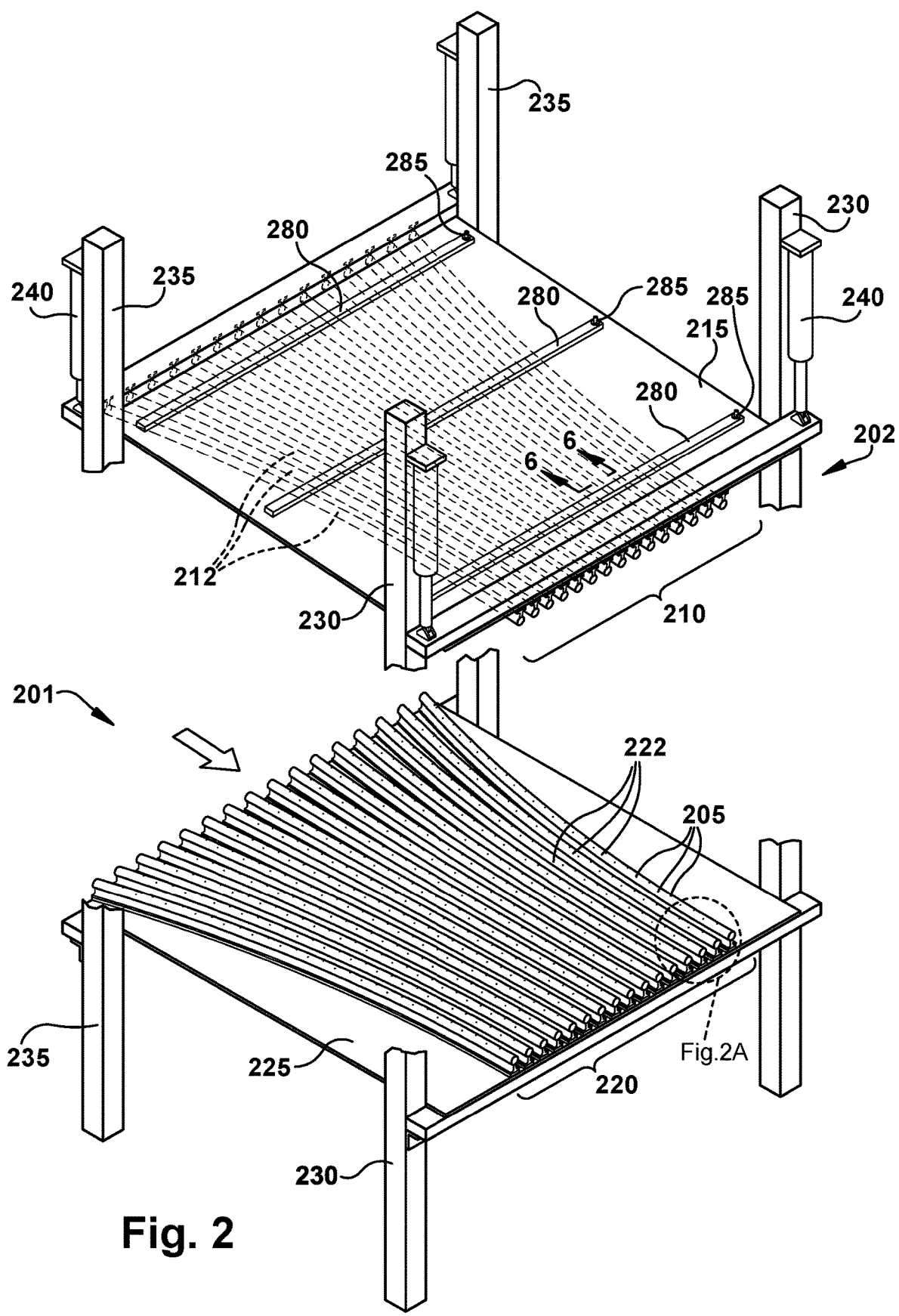
FIG. 2 is a perspective view of a forming device for use in a longitudinal corrugating line, wherein respective first (upper) and second (lower) arrays of flute-forming bars are spaced apart from one another.
Figure 2A:
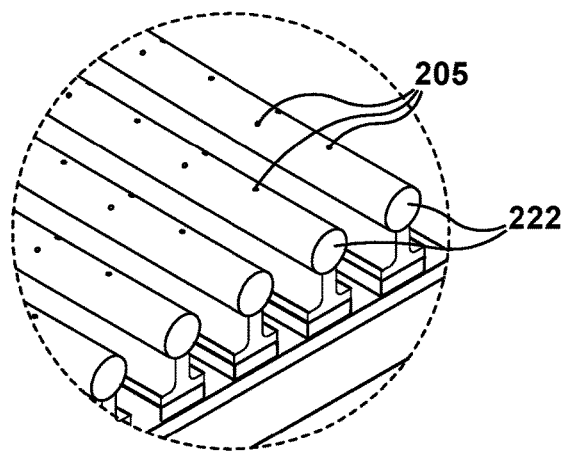
FIG. 2a is a close-up view showing details of flute-forming bars at the exit end of the forming device of FIG. 2.

Once the web 10 has been treated to produce the preconditioned web 10a, that web (or in the absence of preconditioning apparatus 100, the unconditioned web 10) is fed along the web-travel pathway into the forming device 200. An example embodiment of the forming device 200 is illustrated in FIG. 2. In that embodiment the forming device has a first or upper set of flute-forming bars 210 and a second or lower set of flute-forming bars 220. The sets of flute-forming bars 210 and 220 are disposed opposite and facing one another on either side of the web-travel pathway through the forming device 200. In FIG. 2, each of the opposed sets of flute-forming bars 210 and 220 is provided as a substantially planar array of respective first or second flute-forming bars 212 or 222 supported on a respective first (or upper) or second (or lower) frame 215 or 225. The frames 215 and 225 are secured to forward and rear support posts 230 and 235 to fix the relative positions and orientations of the frames 215 and 225 (and correspondingly of the first and second sets/arrays of flute-forming bars 210 and 220) relative to one another. In the illustrated embodiment, the lower frame 225 is secured to the support posts 230,235 in a fixed position such that it is substantially parallel to the web-travel pathway through the forming device 200 and so that its height or position is fixed. The upper frame is secured at its exit end 202 to the forward support posts 230 via position-adjustment actuators 240 capable of adjusting the position or spacing of the upper frame 215 relative to that of the lower frame 225 at the exit end 202 of the forming device 200. The actuators 240 can be, for example, hydraulic or pneumatic pistons, stepper motors, servos, solenoids, or any other suitable or conventional device capable to adjust the position of the upper frame 215 relative to the lower frame 225 at the exit end 202.

In a preferred embodiment, the upper frame 215 is similarly secured to the rear support posts 235 via adjustment actuators 240 as described above, so that the position or spacing of the upper frame 215 is similarly adjustable relative to the lower frame 225 at the entry end 201. Indeed, in preferred embodiments both the entry and exit ends of the upper/first frame 215, and therefore of the upper/first set of flute-forming bars 210, are independently adjustable toward and away from (e.g. height adjustable relative to) the lower/second frame 225, and therefore lower/second set of flute-forming bars 220. In an alternative embodiment, both the first and second frames 215 and 225 can be independently position-adjustable using similar actuators as described above, or adjustable relative to the opposed frame, at one or both of the entry and exit ends 201 and 202 of the forming device.

Figure 4A:
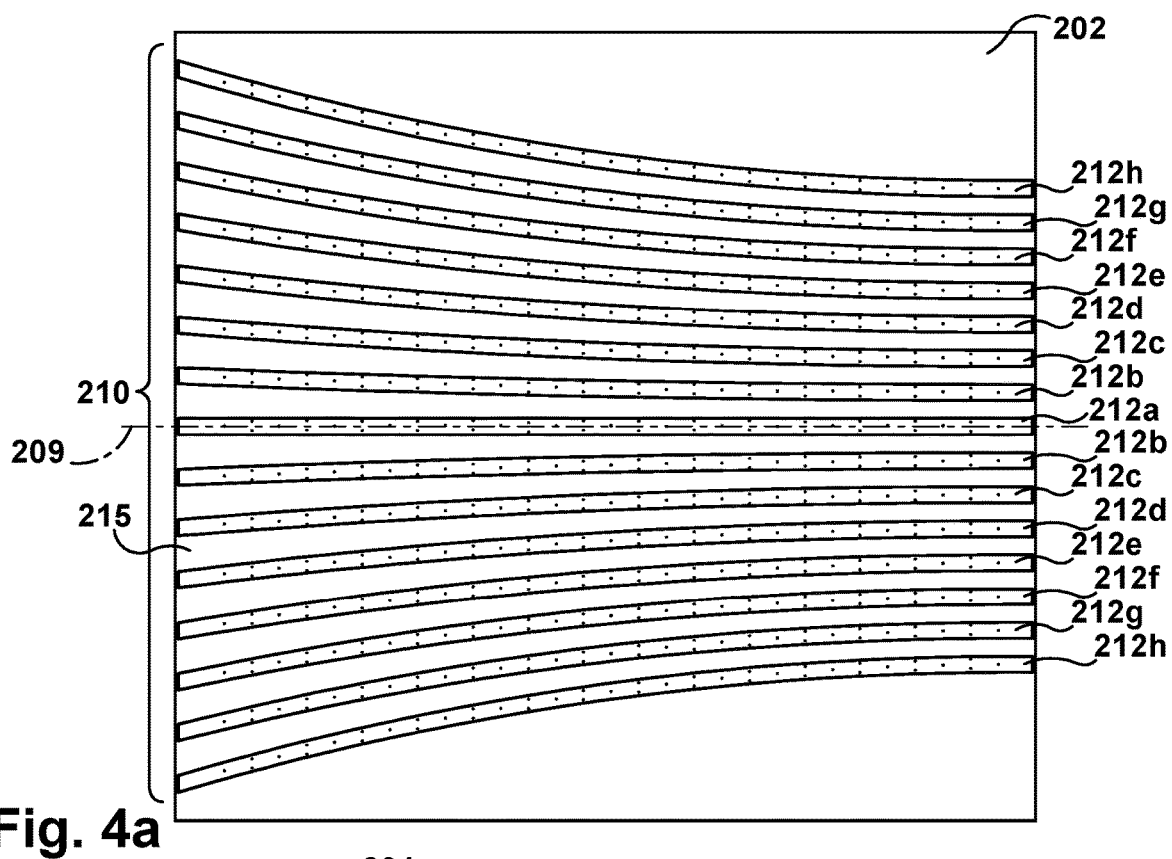
FIGS. 4a and 4b are views of the respective first and second sets of flute-forming bars secured to respective first and second frames, each viewed along a line that is perpendicular to the respective frame and facing the associated set of bars.
Figure 4B:
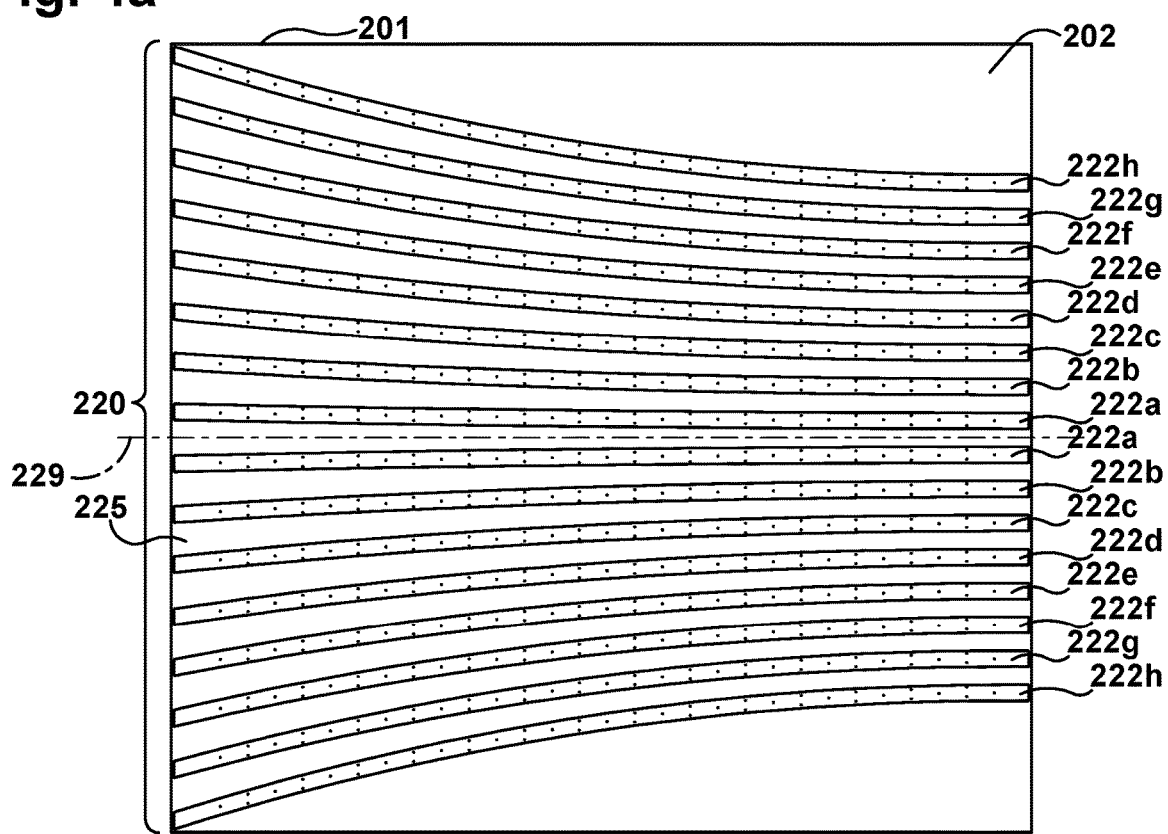

FIGS. 4a and 4b illustrate the respective upper and lower frames 215 and 225 and the associated arrays of flute-forming bars 210 and 220 along a line normal to the respective frame and viewed from a position between the respective arrays 210 and 220. As best seen in these figures, each planar array (set) of flute-forming bars 210 and 220 is arranged such that the associated bars 212 and 222 all generally extend along the machine direction from the entry end 201 toward the exit end 202 of the forming device 220. Individual ones of the flute-forming bars 212 and 222 in each array are curved along at least rear portions or segments thereof such that they converge laterally (in the cross-machine direction) as the bars 212 and 222 proceed in the machine direction from the entry end 201 toward the exit end 202. As used herein, the term 'converge' means to approach or to become closer together, without requiring that the converging elements actually meet. As will become evident below, it is in fact preferred that convergent flute-forming bars as described herein do not actually meet, but instead tend toward and ultimately reach parallel paths. In an embodiment, ones of the bars 212 and 222 cease to curve at a location approaching the exit end 202 of the forming device such that all of the bars 212 and 222 in that device are substantially parallel along the machine direction from that location forward, until the exit end 202. Alternatively, the curved bars may be technically curved all the way up to the exit end 202, although tangents to all of the bars 212 and 222 preferably are substantially parallel to one another along the machine direction at that end 202. More broadly, the convergent flute-forming bars 212 and 222 are characterized by a variable-tangent configuration, wherein imaginary lines drawn tangent to each of the bars at spaced locations along the bar's length become successively nearer to parallel with the machine direction along which a web will travel between the entry end and the exit end 202. A continuously-curved flute-forming bar 212,222, or a continuously-curved rear region (adjacent the entry end 201) thereof, as described in detail herein is preferred for the variable-tangent configuration. But other variable-tangent shapes may be possible. The above features are all more fully described below.

Returning to the preferred embodiment illustrated in FIGS. 4a and 4b, individual bars 212 and 222 in the respective arrays are curved such that they converge toward an imaginary line 209 or 229 in the plane of the associated array that runs along the web-travel pathway parallel to the machine direction in the forming device. Most preferably, that imaginary line 209 or 229 represents a centerline of the respective array as illustrated in the figures, such that at least portions of the individual flute-forming bars 212,222 on either side of the centerline in the respective array 215,225 are curved such that they approach that centerline as they extend in the machine direction. In an exemplary embodiment, one or more of the forming bars 212,222 can exhibit a parabolic curvature, or all of the curved bars 212,222 can exhibit parabolic curvature, between the entry and exit ends 201 and 202.

In the illustrated embodiment the upper array 210 has an odd number of flute-forming bars 212 (15 are illustrated) and the lower array 220 has an even number of flute-forming bars 222 (16 are illustrated). This arrangement permits the respective arrays to be interlaced with one another to define an intermediate longitudinal fluting labyrinth 250 (seen in FIG. 7) for a web 10 of material traveling through the forming device 200 (described below), while also permitting both arrays to be centered along a common centerline (viewed from above), e.g. along a centerline of the web-travel pathway, while interlaced. However, it will be appreciated that both the upper and lower arrays 210 and 220 can comprise odd or even numbers of flute-forming bars (for example, both arrays can include the same number of flute-forming bars), with the caveat that they could not then both be aligned along a common centerline (viewed from above) while interlaced.

Returning to the figures, when an array of flute-forming bars has an odd number of such bars, e.g. bars 212 in the upper array 210 illustrated in FIG. 4a, the centermost flute-forming bar 212a preferably is linear and aligned collinearly with the centerline 209 of the array 210. This centerline also preferably coincides with a centerline of the lower frame 225 and therefore of the forming device 200. More broadly, in an array of forming bars as disclosed herein, it is preferred that the only time one of the forming bars is linear and not curved along at least a segment thereof from the entry end 201 toward the exit end 202 is when that forming bar is aligned and co-linear with the imaginary line toward which the other forming bars in the same array will converge as they extend toward the exit end 202. All other forming bars in the same array will be curved at least in rear portions or segments thereof so as to laterally converge on that imaginary line, and in this case also on the linear forming bar co-linear with said imaginary line.

This can be seen in the upper array 210 illustrated in FIG. 4a, wherein the centermost forming bar 212a is linear, and moreover is co-linear with the imaginary centerline 209 of the array 210. A first pair of forming bars 212b are disposed on either side of and spaced laterally from the centermost bar 212a, each extending from the entry end 201 toward the exit end 202 of the forming device 200, and each being curved such that it converges on the centerline 209 (and on the centermost forming bar 212a) as it proceeds toward the exit end 202. A second pair of forming bars 212c are disposed on either side of and spaced laterally from the first pair of forming bars 212b, again each extending from the entry end 201 toward the exit end 202 of the forming device, and each being curved such that it converges on the centerline 209 (and on the centermost forming bar 212a) as it proceeds toward the exit end 202. A third pair of forming bars 212d are disposed on either side of and spaced laterally from the second pair of forming bars 212c, again each extending from the entry end 201 toward the exit end 202 of the forming device, and again each being curved such that it converges on the centerline 209 (and on the centermost forming bar 212a) as it proceeds toward the exit end 202. Additional pairs of forming bars 212d-h spaced at successively greater intervals from the centerline can be provided in the array 210.

Turning now to the lower array of flute-forming bars 220 illustrated in FIG. 4b, there is no centermost flute-forming bar 222. This is because there are an even number of flute-forming bars 222. Instead the centermost pair of flute-forming bars 222a are each spaced on either side of the centerline 229, with successively more laterally-distant pairs of the flute-forming bars 222b-h being likewise spaced on either side of the centerline 229. Similarly as for the upper array 210, here the second pair of forming bars 222b are disposed on either side of and spaced laterally from the first pair of forming bars 222a, each extending from the entry end 201 toward the exit end 202 of the forming device, and each being curved such that it converges on the centerline 229 of the lower array 220 as it proceeds toward the exit end 202. The successive third through eighth illustrated pairs of lower flute-forming bars 222c-h are likewise successively laterally spaced from the next-centermost pair, and are likewise curved such that each converges on the centerline 229 of the lower array 220 toward the exit end 202 of the forming device 200.

Still referring to FIGS. 4a and 4b, for each of the arrays 210 and 220 the degree of curvature of the associated flute-forming bars 212 and 222 is the greatest at the entry end 201 of the forming device 200, where a web of medium material would first enter that device 200. The degree of curvature of the flute-forming bars gradually decreases as the bars proceed toward the exit end 202, from which a formed web 10b (see FIG. 7a) would emerge during a longitudinal corrugating process. The result is that individual flute-forming bars 212 and 222 converge rapidly toward the imaginary centerline (or other longitudinal line) in the respective array 210 or 220 adjacent the entry end 201 of the forming device. However, as the degrees of curvature of the bars decrease in the machine direction, so does the rate of convergence of the flute-forming bars gradually decrease, preferably until all the bars 212 or 222 in the respective array 210 or 220 become generally linear and parallel to one another in the machine direction at the exit end 202 of the forming device 200. That is, the bars 212 and 222 can cease to be curved at a location approaching the exit end 202, beyond which they are all generally linear and parallel as described above. Alternatively, the bars 212 and 222 may continue to be curved up to the exit end 202 of the forming device 200, wherein the degree of curvature will preferably be substantially reduced at the exit end 202 compared to the entry end 201 so that at the exit end 202 they are all approximately linear and parallel. In any event tangents of all the flute-forming bars 212 and 222 at the exit end 202 are all substantially parallel along the machine direction.

Figure 4C:
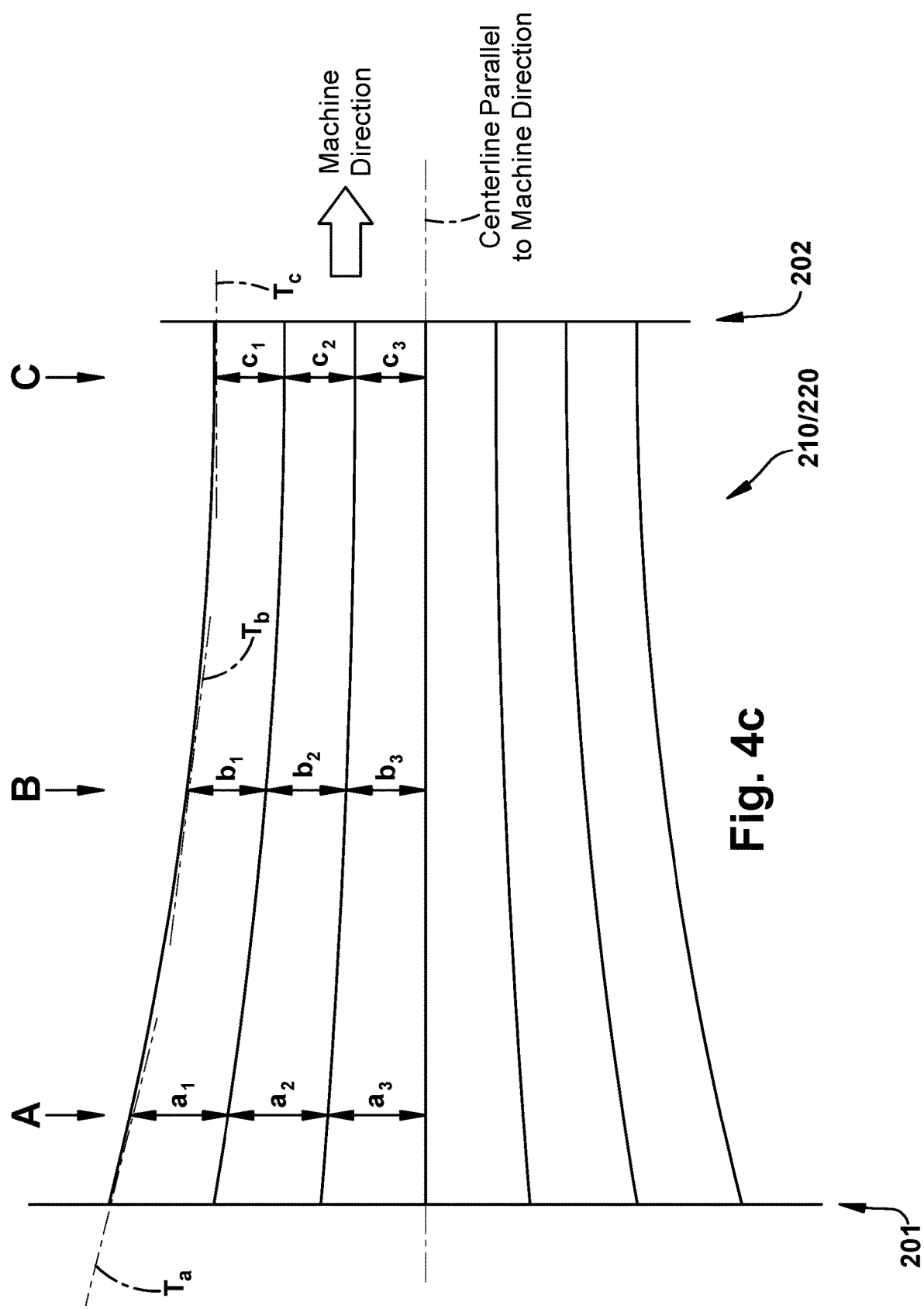
FIG. 4c is a schematic view of an array of flute-forming bars as described herein, e.g. of one of the arrays illustrated in FIGS. 4a and 4b, illustrating the constant lateral spacing between laterally adjacent flute-forming bars in each array.

As illustrated schematically in FIG. 4c, for a given array 210 or 220 it is preferred that the flute-forming bars 212 or 222 in that array are substantially equidistant at any given location along the machine direction in the forming device 200. For example, FIG. 4c schematically illustrates three longitudinal locations along the machine direction, A, B and C, such that the lateral distances between adjacent ones of the flute-forming bars are all equal at the respective locations. That is, the lateral distances $a_1$, $a_2$ and $a_3$ between adjacent flute-forming bars at machine-direction location A are all equal, and likewise for machine-direction locations B (distances $b_1$, $b_2$ and $b_3$) and C (distances $c_2$ and $c_3$). In preferred embodiments, the above holds true for both of the first and second (upper and lower) arrays of flute-forming bars 210 and 220 in the forming device 200.

It will be appreciated, again with reference to FIG. 4c (and also FIGS. 4a and 4b), that while the flute-forming bars in a given array are preferably all equidistant any given location along the machine direction, the lateral distance between adjacent bars decreases as the bars proceed in the machine direction toward the exit end 202 of the forming device, at least along rear segments or portions of the bars. That is, referring to FIG. 4c, $a_1 > b_1 > c_1$ at least in rear convergent segments or portions of the flute-forming bars 212, 222, consistent with the fact that those bars preferably laterally converge as they proceed in the machine direction toward the exit end 202. In preferred embodiments, that convergence is the result the lateral curvature of at least a subset (e.g. all but the center-most) of the flute-forming bars 212,222 in each array 210 or 220 as discussed above. More broadly, however, it will be understood that the noted subset of flute-forming bars 212,222 have a variable tangent configuration, such that imaginary tangents to each of those flute-forming bars, drawn at spaced locations along the length of each such bar, become successively nearer to parallel with the machine direction as that bar proceeds toward the exit end 202 of the forming device. This is illustrated schematically in FIG. 4c, wherein for a given flute-forming bar 212, 222 a tangent line $T_a$ drawn at machine-direction location "A" remote from the exit end is not parallel with the machine direction; i.e. with the centerline in that figure. Whereas, a tangent line $T_b$ drawn at location "B" nearer to the exit end is closer to parallel with the machine direction, and a tangent line $T_c$ drawn at location C essentially at the exit end is parallel or approximately parallel to the machine direction. In the preferred embodiments described here and illustrated in the figures, each of the flute-forming bars 212,222 having the aforementioned variable tangent configuration is continuously and smoothly curved in its variable-tangent region, which may be a rear portion of the bar or it may be the full length of the bar. Alternatively and less preferably, the variable-tangent region may be formed as a series of linear or stepped forming-bar segments that together integrate to or approximate a curve (not shown) beginning adjacent the entry end and extending toward the exit end 202.

Figure 3A:
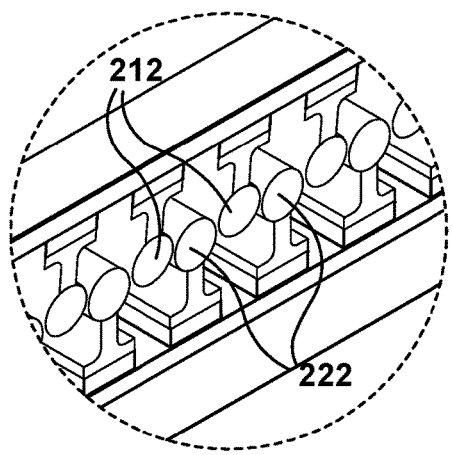
FIG. 3a is a close-up view showing details of interlaced flute-forming bars at the exit end of the forming device of FIG. 3.
Figure 3:
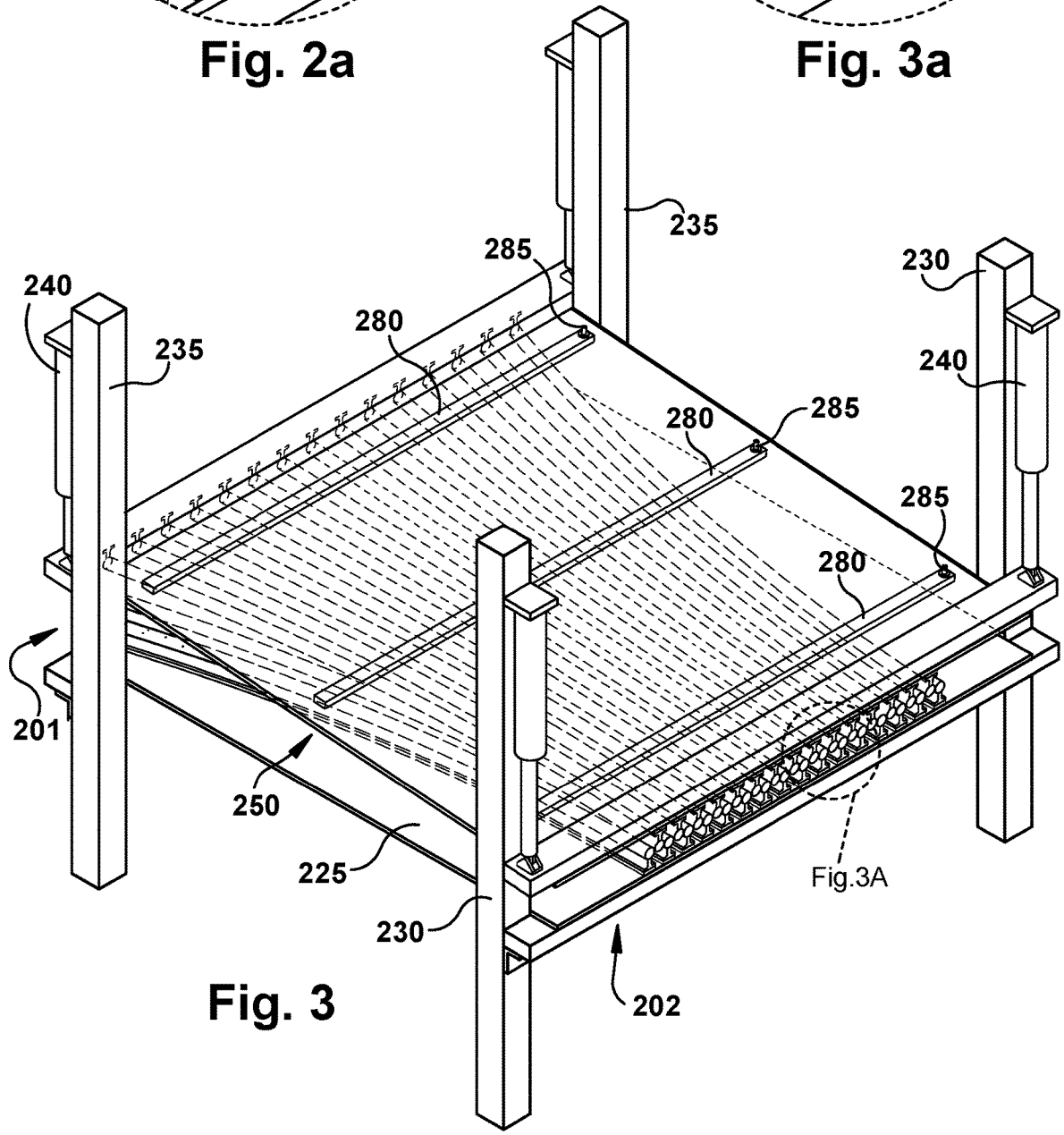
FIG. 3 is a perspective view of the forming device of FIG. 2, wherein the first and second arrays of flute-forming bars have been partially engaged to interlace the opposing flute-forming bars beginning at a location intermediate the entry and exit ends of the forming device, with the degree of interlacement increasing in the machine direction toward the exit end.

Returning to FIG. 2 and referring now to FIG. 3, the respective and opposed first and second arrays 210 and 220 of flute-forming bars are configured so that on approaching one another they become interlaced in order to define an intermediate longitudinal fluting labyrinth 250 therebetween. In FIG. 3, the position of the upper frame 215 has been adjusted toward the lower frame 225 at the exit end 202 to interlace the forward portions of the opposing flute-forming bars 212 and 222 at the exit end 202 and in the exit region of the forming device 200. In the same figure, the upper frame 215 has also been adjusted toward the lower frame 225 at the entry end 201, although to a lesser degree than at the exit end 202, in order to adjust the location of the choke point 290 (FIG. 7) at which the opposing flute-forming bars 212 and 222 just begin to interlace as described more fully below. In a preferred embodiment, the curvatures of the respective flute-forming bars 212 and 222 in the opposing arrays 210 and 220 are such that the interlaced flute-forming bars 212,222 are equidistant or substantially equidistant from one another at any given longitudinal location along the machine direction in the forming device 200, and such that curved ones thereof all similarly converge laterally toward a common imaginary line (preferably a centerline) parallel to the machine direction in the forming device.

FIG. 5 is a schematic plan view illustrating the interlaced upper and lower sets 210 and 220 of flute-forming bars 212 and 222, wherein upper bars 212 are represented by solid contour lines and lower bars 222 are represented by partially broken contour lines. It will be appreciated that the contour lines representative of alternating upper and lower flute-forming bars 212 and 222 are similar to the contour lines illustrated in FIG. 4c for only one array of those bars. Indeed, the interlaced array in FIG. 5 exhibits similar features. Namely, the degrees of curvature (and therefore the rate of convergence) of curved interlaced flute-forming bars 212,222 in FIG. 5 decrease as the bars proceed in the machine direction toward the exit end 202, at least in rear portions of the bars. The lateral spacing between adjacent ones of the interlaced bars 212,222 is also preferably constant (i.e. all the interlaced bars are preferably substantially equidistant) at any given longitudinal location along the machine direction, with said spacing becoming gradually smaller as one proceeds in that direction. Preferably, the flute-forming bars 212,222 in the interlaced array in FIG. 5 (and also seen in perspective view in FIG. 3) also are all generally linear and parallel to one another in the machine direction in an exit region of the forming device; i.e. adjacent the right-hand side of each of FIGS. 3 and 5.

Figure 6:
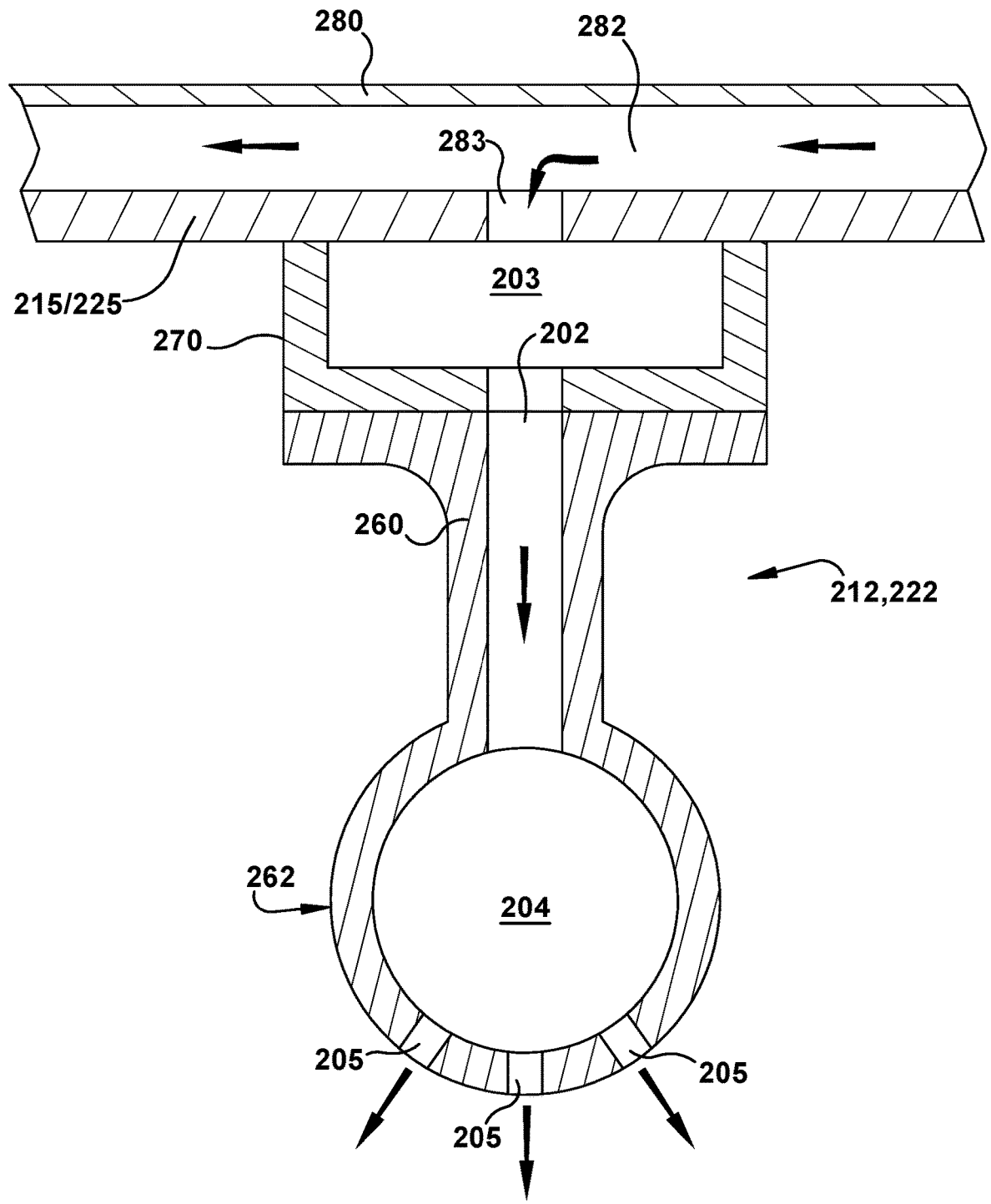
FIG. 6 is a lateral cross-section of a flute-forming bar used in a flute-forming device as disclosed herein, taken along line 6-6 in FIG. 2.

Turning to FIG. 6, an exemplary flute-forming bar 212/222 is shown in lateral section. In the illustrated embodiment, the forming bar 212/222 includes a base portion 260 and a web-engagement portion 262. In interlaced portions of the opposing sets of flute-forming bars 210 and 220 in operation, the respective engagement portions 262 of one set of bars are received in the lateral spaces defined between adjacent engagement portions 262 of the flute-forming bars in the opposing set. This can be seen most clearly in FIG. 3a. The flute-forming bars 212/222 can be secured directly to the associated frame 215,225. Alternatively, and particularly when a high degree of interlacement or (i.e. the degree to which the engagement portions 262 of the first set of bars 210 penetrates beyond an imaginary plane tangent to the outermost surfaces of the engagement portions 262 of the second set 210, and vice versa) may be desired, the flute-forming bars 212,222 can be formed or secured to spacers 270 to increase the distance between the web-engagement portion and the associated frame 215,225. The flute-forming bars 212,222 can be secured to the spacers 270 in any conventional or suitable manner, e.g. via welding, brazing, adhesives or mechanical fasteners using appropriate gaskets to ensure a fluid-tight seal. Alternatively the flute-forming bars 212,222 can be formed integrally with the associated spacers 270, effectively resulting in a relatively tall flute-forming bar 212,222.

Figure 7:
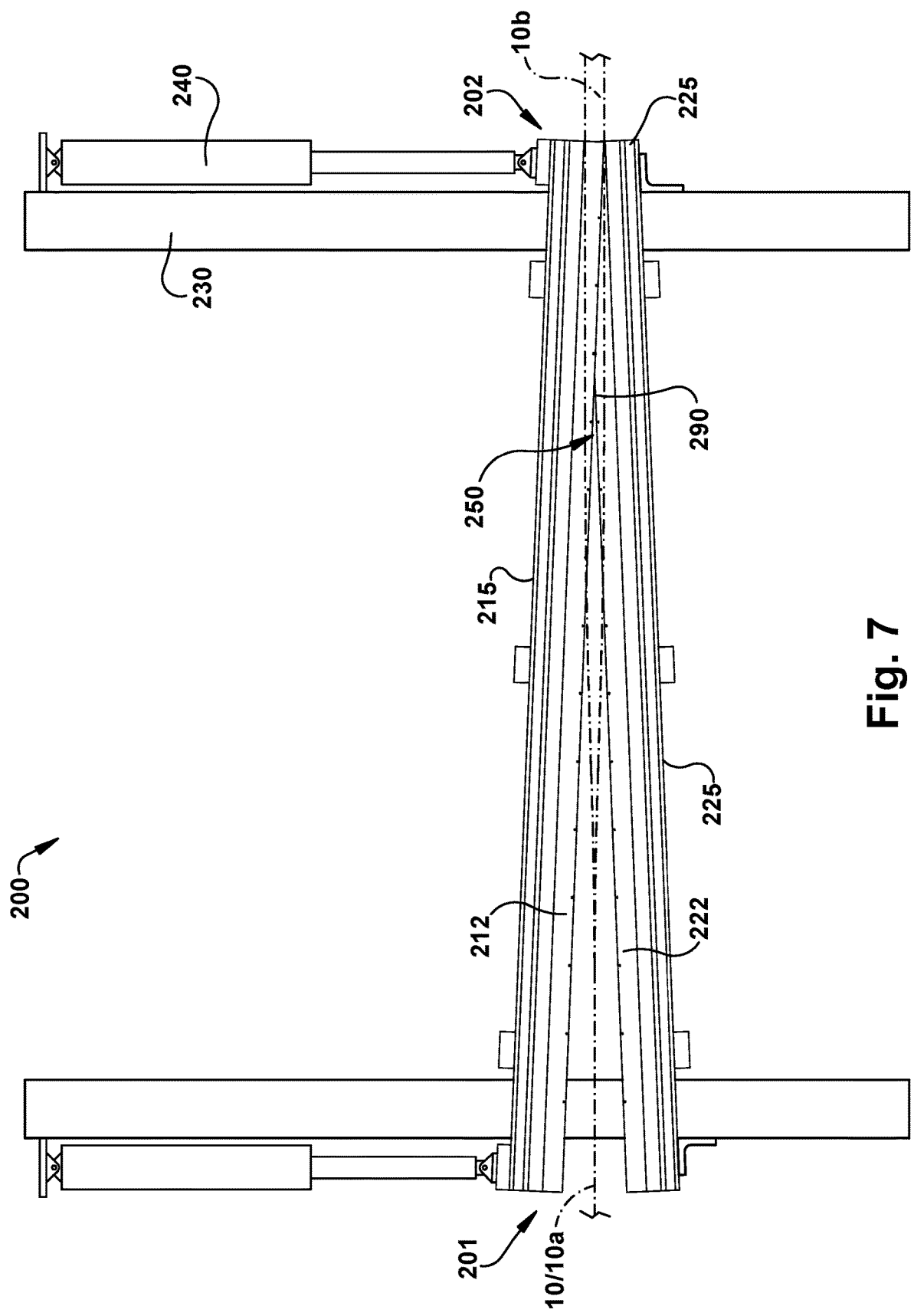
FIG. 7 is a side view of a forming device as disclosed herein, shown during a state of operation, e.g. with the arrays of flute-forming bars engaged as in FIG. 3.
Figure 7A:
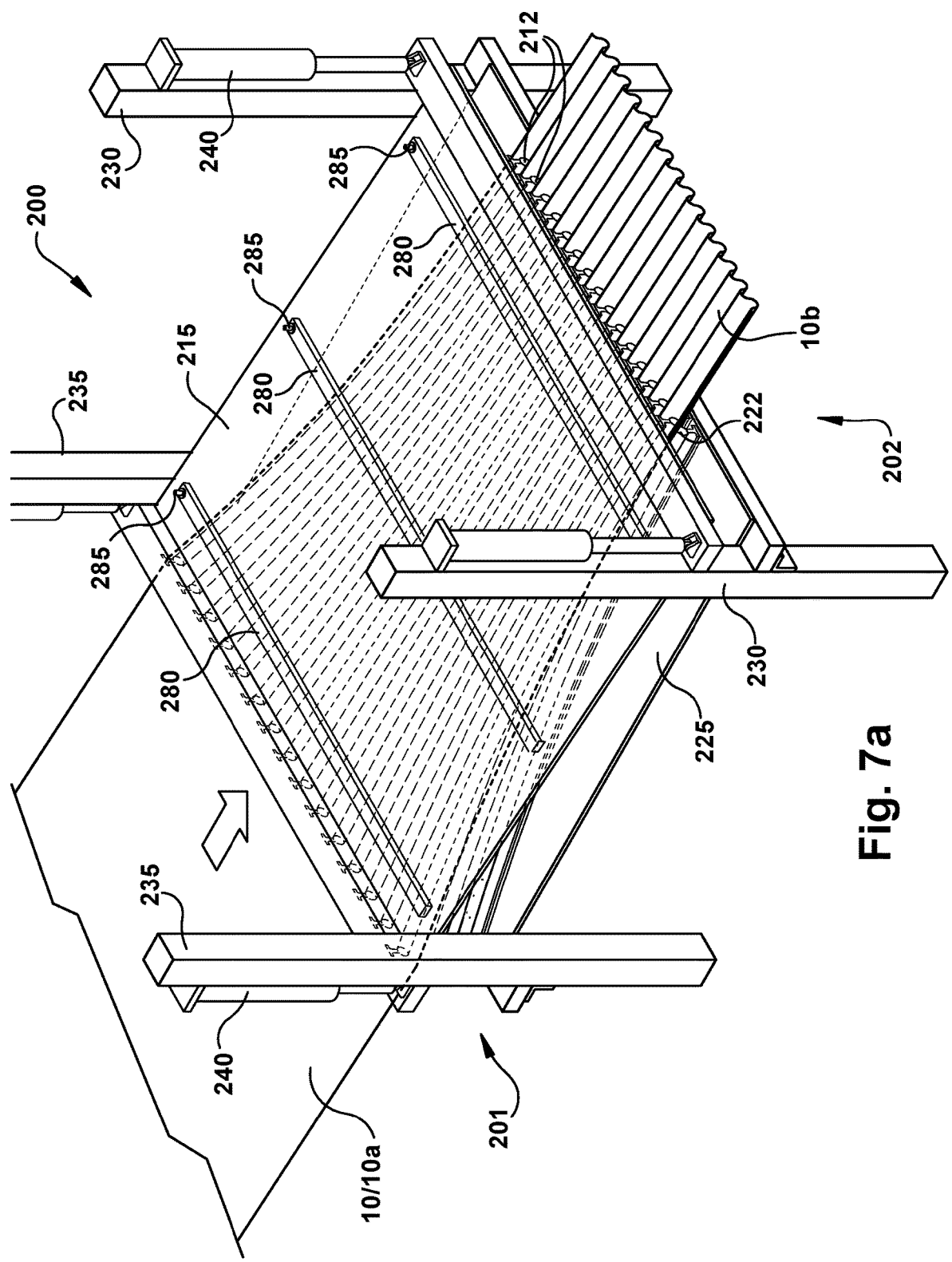
FIG. 7a is a perspective view of the forming device in FIG. 7 shown during the same state of operation.

In operation web-engagement portion 262 of the flute-forming bar 212,222 engages a traveling web 10 in the forming device to thereby form intermediate longitudinal flutes therein to produce the formed web 10b (see FIG. 7a). Accordingly, the engagement portion 262 preferably has a generally rounded (e.g. cylindrical) surface for contact with the web 10. The engagement portion 262 surface can include an anti-friction surface feature to thereby reduce the frictional forces on the web 10 as it passes between the interlaced first and second sets of flute-forming bars 210 and 220 to introduce the intermediate fluted geometry thereto (i.e. as the web 10b is formed) in the forming device 200. In one example, the flute-forming bars 212,222 or portions thereof can be zero-contact bars operable to support the web 10 of medium material at a variable height thereabove on a cushion of air or other fluid that is emitted through fluid ports 205 provided in the engagement portions 262. Preferably the ports 205 are distributed over the engagement portions 262 of the forming bars 212,222 substantially along their entire lengths, or at least along the portions thereof that will engage a traveling web 10 during use.

When the flute-forming bars 212,222 are operated as zero-contact bars, preferably the engagement portion 262 of each zero-contact bar has a fluid passageway 204 therein in fluid communication with the fluid ports 205 for conducting the desired fluid (such as air) to those ports 205. The fluid exits those ports 205 to thereby provide a cushion of the fluid between the engagement portion 262 surface and the web 10 in order to support the traveling web 10 above the engagement portion 262 and thereby reduce or minimize friction as the web passes over the bars 212,222. Preferably, the fluid cushion permits frictionless support of the web as it travels through the intermediate fluting labyrinth 250 between the opposed forming bars 212,222.

Returning to FIG. 6, the fluid passageway 204 preferably is in fluid communication with a spacer passage 203 at the interior of the spacer 270 on which it is secured, e.g. via a passage 202 in the base 260 of the forming bar 212,222. In this embodiment, the flute-forming bars 212,222 can be extruded or gun drilled to provide the fluid passageway 204 and passage 202. When formed together with the spacer 270, the entire assembly can be prepared as a single extrusion so that the spacer passage 203, passage 202 and fluid passageway 204 cooperate to form a distribution manifold for the associated forming bar 212,222 to deliver fluid through the holes 205 therein.

As seen in FIGS. 2 and 6, at least one supply manifold 280 for the cushioning fluid can be provided on the surface of the upper frame 215 opposite the surface where the flute-forming bars 212 are mounted. The supply manifold(s) 280 can be in the form of a U-shaped channel having closed ends, with the open face of the channel facing and being sealed to the surface of the frame 215 in order to define a supply passage 282 for fluid as seen in FIG. 6. The supply passage 282 communicates with the aforementioned spacer passage 203 (or directly with the passage 202 when no spacer 270 is used) for each flute-forming bar 212 via a supply opening 283 drilled or otherwise formed in the frame 215. As will be appreciated, the frame 215 can have a plurality of supply openings 283 communicating with the supply passages 282 of each supply manifold 280, corresponding to and laterally aligned with the number and locations of flute-forming bars 212 at the opposite surface of the frame 215. The manifold 280 can be secured to the frame 215 surface via conventional or suitable means, for example via welding or brazing to provide a continuous airtight seal, or using other mechanical fasteners with a suitable gasket to likewise ensure a tight seal. The fluid can be supplied to the manifold 280 via a conventional fitting 285 (seen in FIG. 2). As also seen in FIG. 2, a plurality of supply manifolds 280 can be distributed along the machine direction. These plurality of manifolds 280 can be connected to a common fluid source to supply the same fluid (including flow rate and pressure) at all three locations, or they can be connected to different fluid sources, or each can be independently regulated, to deliver different fluids or different flow rates and pressures at different machine-direction locations as more fully described below.

Although the foregoing description of the supply manifold(s) 280 was given and illustrated with respect to the first frame 215 to which are mounted the first set of flute-forming bars 210, the identical arrangement can be incorporated for the second frame 225 in order to supply a cushioning fluid to the flute-forming bars 222 in the second set of said bars 220.

In one embodiment, all of the flute-forming bars 212,222 in both the upper and the lower arrays 210 and 220 can be supplied from a common fluid source and regulated from a common single metering or throttling valve located upstream of both the respective supply manifolds 280 (e.g. one manifold 280 for each set of forming bars 210 and 220). In this embodiment, a single supply manifold 280 can be used for each of the upper and lower arrays 210 and 220 (i.e. affixed to each of the respective upper and lower frames 215 and 225). Alternatively, respective pluralities of manifolds 280 can be positioned and used in connection with each set 210 and 220 of flute-forming bars, all connected in parallel to a commonly-regulated fluid source. In both these embodiments the pressures and flow rates of the supportive fluid delivered to all the bars 212,222 would be commonly controlled, resulting in substantially uniform pressures and flow rates of that fluid through the holes 205 in all the flute-forming bars 212,222.

Alternatively, the respective manifold(s) 280 associated with each set 210 or 220 of flute-forming bars 212 or 222 could be fitted with its/their own dedicated device for regulating pressure and flow rate of the fluid. Suitable regulation devices include, for example, metering or throttling valves, pressure controllers, mass-flow controllers or some combination of these. For example, a pressure regulator or mass-flow controller could be mounted in-line with the fitting(s) 285 of the respective manifold(s) 280 associated with only one set of flute-forming bars 212 or 222, between the fitting(s) and the fluid source. This embodiment would provide common control and substantially uniform pressures and flow rates for web-supporting fluid through all of the flute-forming bars 212 in the first set 210 thereof secured to the first frame 215, and separately for all the flute-forming bars 222 in the second set 220 thereof secured to the second frame 225. In other words, the flow rates and fluid pressures would be substantially uniform in each array of flute forming bars 210 and 220, but the flow rates and pressures in the first array 210 could be regulated independently of the flow rates and pressures in second array 220 and vice versa. This may be desirable, for example, for dense, heavy webs traveling in a horizontal machine direction, where additional pressure from the bottom might be useful to support the traveling web 10 centrally and against the action of gravity within the longitudinal fluting labyrinth 250. Alternatively, when the forming device 200 has a fluting labyrinth 250 that follows a curved pathway (described below) additional pressure may be desired from the side of the web 10 outside the direction the web must turn as it follows the web-travel pathway through the curved labyrinth 250.

In a further alternative embodiment, successive supply manifolds 280 distributed along the machine direction of the forming device 200 can be independently connected in fluid communication with respective and isolated longitudinal zones or segments of the flute-forming bars 212 or 222 secured to the associated frame 215 or 225. For example, one or a plurality of the flute-forming bars 212,222 can be provided in segments or having segmented distribution manifolds (e.g. segmented fluid passageways 204 and cooperating spacer passageways 203 if present), wherein each segment of the bar 212,222 or its distribution manifold correlates to a longitudinal zone of the forming device 200 extending only partway of the full longitudinal extent of that bar (including all of its segments) along the machine direction. In this embodiment, different pressures and flow rates of web-supporting fluid, or even different fluids, can be distributed to the flute-forming bars 212,222 to be emitted via fluid ports 205 at different longitudinal zones in the forming device 200. This may be desirable in order to successively increase the amount of force normal to the planar extent of the web imparted thereto by supportive fluid emitted along the lengths of the flute-forming bars 212,222. For example, the pressure (normal to the planar extent of the web) required to induce bending of that web around a radius of curvature following one of the bars 212,222 can be represented by the following relation:

$$P = \frac{\text{Force to bend} \left(\frac{\text{lb}_f}{\text{inches width}}\right)}{\text{Radius of curvature (inches)}}$$

As will be appreciated, the radii of curvature of the web at fixed web locations gradually decrease as longitudinal flutes are formed while the web travels in the machine direction through the labyrinth 250 between increasingly interlaced forming bars 212,222. From the foregoing relation and assuming a uniform web, as the radii of curvature decrease the amount of pressure needed to sustain that curvature will increase proportionately. Therefore, by increasing the fluid pressure emitted from fluid ports 205 at successive longitudinal zones in the machine direction, one can conserve fluid and pumping power at upstream longitudinal locations where a relatively high degree of pressure is not required to sustain the web in spaced relation to the adjacent flute-forming bars 212,222. The degree of fluid pressure and its flow rate can thus be increased at successive longitudinal zones where increased pressure may be required to sustain the web in spaced relation to the bars 212,222 at greater degrees of fluting; i.e. lower radii of curvature in the formed/forming flutes. In this embodiment, the respective supply manifolds 280 connected in fluid communication to the opposing flute-forming bars 212 and 222 in the same longitudinal zone can be supplied in parallel from the same fluid source and commonly regulated. This will ensure common fluid pressures and flow rates from both the first and second sets 210 and 220 of flute-forming bars in the same longitudinal zone.

In still a further alternative, each individual flute-forming bar 212,222 or groups of them may be provided with independent fluid-flow control, e.g. using pressure regulators or mass-flow controllers provided in-line with the distribution manifold (e.g. channel passage 203) for each flute-forming bar 212,222 but downstream of the supply manifold 280 (not shown). In this embodiment pressures and flow rates of web-supporting fluid can be individually controlled for each flute-forming bar 212,222. This could be desirable, for example, if a web-tension spike is detected downstream of the forming device 200 at only a discrete lateral (cross-machine) position in the web. In that event, the fluid pressure/flow rate of only the forming bars 212,222 at the associated cross-machine position might be increased based on a feedback control system to provide additional cushion and thus reduce friction at that location.

In each of the foregoing embodiments, a pressurized fluid such as air or steam is delivered to the supply manifolds 280 via the ports 285 using appropriate hoses, piping or tubing, which are conventional. The pressurized fluid travels through the supply passage 282, through respective supply openings 283 and into distribution manifolds associated with each of the flute-forming bars 212,222, ultimately being emitted via the associated fluid ports 205. The fluid thus provides a fluid cushion (e.g. air) above each flute-forming bar 212,222 on which the traveling web 10 can be supported or float as it traverses the intermediate longitudinal fluting labyrinth 250 in the forming device 200. The cushion provides air-greasing (i.e., lubrication) that can reduce or eliminate sliding frictional contact between the web 10 and the forming bars.

In addition to minimizing friction encountered by the web 10 as it traverses the labyrinth 250, operating the forming bars 212,222 in the zero-contact mode described here can provide an elegant mechanism of feedback control for the mean web tension via an active or passive pressure transducer (not shown) that can be used to detect the pressure in the air cushion under the web 10. Air-cushion pressure and web tension are related according to the relation $P=T/R$. Thus, monitoring the air cushion pressure, P, provides a real-time measure of the tension in the web. Additionally, in the zero-contact mode the cushion of air between each of the forming bars 212,222 and the traveling web 10 provides a mechanism of instantaneous damping of minute tension fluctuations in the web, because the web is free to dance above the forming bars on the cushion of air in response to transient and minute tension variances. The result is that the web is less affected by such transient tension variances. Finally, it is important to mention that "zero-contact" is not meant to imply there can never be any contact (i.e. literally "zero" contact) between the flute-forming bars 212,222 and the web 10. Even operated in the zero-contact mode as described here, some contact may occur due to transient or momentary fluctuations in mean web tension, or in localized web tension, of sufficient magnitude.

In addition or alternatively to operating in the zero-contact mode as discussed above, the web-engagement portions 262 of the forming bars 212,222 can include other features designed to minimize or eliminate friction. In one example, the surfaces of engagement portions 262 can be polished or electro polished in order reduce the frictional forces on the web as it is passing through the fluting labyrinth 250. In another example, those surfaces can be coated with a release or antifriction coating such as PTFE (Teflon®) or similarly low-friction material in order reduce the coefficient of friction at the surfaces and thus to reduce frictional forces between them and the passing web 10. In another example, those surfaces can be treated to create a hard surface coating such as by black oxide conversion coating, anodizing, flame spraying, deposition coatings, ceramic coating, chrome plating, or other similar surface treatments in order reduce the coefficient of friction.

In operation as best seen in FIGS. 7 and 7a, the forming device 200 receives a substantially planar web 10 (e.g. a preconditioned web 10a) at its rear or entry end 201. On entry into the forming device 200, the web 10 is full width because it is still planar, and none of its width has yet been taken up by longitudinal fluting. In use the degree of interlacement of the opposing flute-forming bars 212 and 222 is adjusted at the forward or exit end 202 to fix the lateral take-up ratio of the formed web 10b on exiting the forming device. For example, following are typical or traditional take-up ratios for a number of conventional flute sizes:

| Standard Flute Size | Take-up Ratio |
| --- | --- |
| A | 1.56 |
| C | 1.48 |
| B | 1.36 |
| E | 1.28 |
| F | 1.19 |
| N | 1.15 |

Thus, in case it is desired to ultimately produce a longitudinally-corrugated web having, e.g., conventional A-size flutes, the starting width of the initial flat web 10 should be 1.56 times the final desired width of the longitudinally-corrugated web to be made in the corrugating line 1000. Accordingly, if a 50-inch wide longitudinally A-fluted web is desired, then the starting flat web width should be 78 inches wide (1.56×50 inches). Similar calculations could be performed for other standard flute sizes based on the desired finished web widths. In each case, the forming device 200 can be used to reduce the width of the flat web 10 from its initial width (e.g. 78 inches for an A-fluted longitudinally-corrugated web) to the final, narrower width of the desired web (e.g. 50 inches for the A-fluted web).

The web 10/10a is fed into the forming device 200 from the rear/entry end 201 in the machine direction, so that the web passes between the opposed sets 210 and 220 of flute-forming bars 212 and 222. The position of the first frame 215 is adjusted relative to the second frame 225 at the forward/exit end 202 so that the degree of interlacement of the opposing bars 212 and 222 produces a serpentine lateral path (i.e. in the cross-machine direction, best seen in FIG. 3a) sufficient to consume the desired proportion of web width so that the formed web 10b exiting the forming device will have a width that is or approximates that of the desired finished web 10d. In other words, the degree of interlacement of the forming bars 212 and 222 at the exit end 202 dictates the degree to which the width of the initial web 10 is gathered to produce a formed web 10b on exiting the device 200 as seen in FIG. 7a. The greater the degree of interlacement at the exit end 202, the more web material will be consumed in the cross-machine direction as the web negotiates the interlaced forming bars 212 and 222 while traveling in the machine direction.

It is also preferred that the position of the first frame 215 is adjusted at its rear or entry end 201 relative to the second frame 225. Specifically, once the degree of interlacement at the exit end 202 has been fixed, the position of the first frame 215 is adjusted at the entry end 201 (relative to the second frame 225) to select the location of a choke point 290 along the machine direction where the opposed bars 212 and 222 just begin to interlace. In operation the choke point 290 is where the entering web 10/10a first contacts or encounters the opposed first and second flute-forming bars 212 and 222 uniformly across its entire width as seen in FIG. 7, as well as in FIG. 5. In FIG. 7, the web 10 is illustrated gaining height as the longitudinal flutes are formed in the labyrinth 250. The web height begins to increase ahead of the choke point 290 in the illustrated embodiment because as the web is positively fluted at that point, a portion of the web upstream of the choke point 290 may be induced to assume or to begin conforming to a fluted configuration, as well.

The location of the choke point 290 is selected based on the width of the entering web 10/10a, so that at or adjacent the choke point 290 the lateral edges of the entering web encounter and are positioned adjacent (or contact or are supported by) ones of the forming bars 212 and 222 whose lateral spacing at the exit end 202 (based on their curvature from the choke point forward) defines or approximates the desired width of the formed web 10b on exiting the forming device 200. In this manner, the lateral edges of the entering web 10/10a will follow the curvature of the respectively adjacent forming bars 212 and 222 in the machine direction as they converge laterally on approaching the exit end 202 of the forming device, and will be spaced apart by the desired width of the formed web 10b on exiting that device 200.

This will be further understood with reference to FIG. 5, which illustrates a schematic top view of the interlaced array of opposed forming bars 212 and 222, wherein the bars are represented by contour lines. As seen in the figure, initial webs 10/10a are depicted schematically entering the interlaced array from the entry end 201 in order to be longitudinally fluted to an intermediate geometry to produce a formed web 10b having a desired final width. The initial web marked "A" indicates a web intended to produce a longitudinally A-fluted web at the illustrated final width, and the initial web marked "C" indicates a web intended to produce a longitudinally C-fluted web at the final width. (Note that FIG. 5 and the take-up ratios therein are not to scale; the figure is for illustrative purposes only). From the table above, a typical take-up ratio for A-flutes is 1.56, and for C-flutes is 1.48. Although not to scale, the figure shows that to achieve a formed web 10b of the same final width, an initially wider web will be required if A-flutes are to be introduced downstream than for C-flutes, because A-flutes demand a greater take-up ratio.

As discussed above, the final interlacement of the opposing flute-forming bars 212 and 222 at the exit end 202 will define the take-up ratio in the forming device 200. Separately, the choke point 290 is selected based on the initial width of the entering web 290 as discussed above. In FIG. 5 the width of the "A" initial web 10/10a corresponds to the spacing of the two outermost forming bars 212,222 all the way at the rear/entry end 201 of the forming device 200. Thus the choke point 290 can be positioned at or adjacent the entry end 201 because as the lateral edges of the "A" web proceed in the machine direction, they will follow contour lines along the curvature of the adjacent forming bars 212 and 222 and thus converge to the final desired width of the formed web 10b at the exit end 202. However, because the "C" initial web 10/10a is narrower the choke point 290 is adjusted downstream in the machine direction so that the "C" web's lateral edges will first encounter ones of the forming bars 212,222 that at the exit end 202 will define or approximate the final desired width of the formed web 10b. In the situations illustrated in FIG. 5, the opposed sets of forming bars 210 and 220 would be adjusted so that the choke point 290 for the respective "A" or "C" web is coincident with or adjacent where the outer edges of the respective web also encountering the laterally outermost flute-forming bars 212,222. This would be desirable, for example, when the distance between the outermost forming bars 212,222 at the exit end 202 corresponds to the desired width of the formed web 10b. Thus as will now be appreciated, the distance between the outermost forming bars 212,222 at the exit end 202 can be selected to correspond to a desired standard width for longitudinally-corrugated webs regardless of the corrugation pitch. When configured this way, the choke point 290 for a given initial web width would routinely be adjusted to coincide with or to be adjacent the location where the web's outer edges would encounter the laterally outermost flute-forming bars 212,222.

It is noted that for a given web and take-up ratio combination, some routine iteration may be desirable to optimize the location of the choke point 290 once the take-up ratio has been fixed at the exit end 202, to account for variable degrees by which different webs might be induced to commence a fluted configuration upstream of the choke point. In such instances, the choke point location should be selected to ensure that little or no cross-machine translation of the web occurs over or relative to the flute-forming bars 212, 222, at least at locations in contact with flute-forming bars. In most instances, the curvature of the bars 212,222 should prevent this even in cases when the web is induced to begin assuming a fluted configuration upstream of the choke point. But some iteration may be desirable in such cases.

It will be appreciated that in operation, as a web traverses the fluting labyrinth 250 in the machine direction, its width is gathered in the cross-machine direction through the gradual formation of a full-width array of longitudinal flutes of intermediate geometry. As the web progresses through the labyrinth 250 the array of intermediate-geometry flutes are gradually and uniformly introduced (i.e. substantially contemporaneously across the full width of the web) into the web as the degree of interlacement of opposing flute-forming bars 212,222 increases from the choke point 290 forward, and as those bars converge in the cross-machine direction based on their curvature. Based on the curvature of the flute-forming bars 212 and 222, substantially no portion of the web must traverse any of those bars in a cross-machine direction in order to converge in that direction to gather (i.e. reduce) web width. Rather, individual elements of the web follow the convergent, curved contour lines of the forming bars 212 and 222, or curved contour lines between adjacent ones of those forming bars, so that they experience only machine-direction translation relative to the forming bars 212 and 222 and no cross-machine-direction translation relative to those bars or any other flute-forming element. As a result, zero or substantially no lateral friction or tension forces, or lateral friction or tension fluctuations are introduced into the web as it traverses the fluting labyrinth 250 because the web is not stretched or pulled laterally as it passes through that labyrinth 250. In other words, in the forming device 200 no portion of the web 10 must negotiate an undulating pathway bounded by forming bars 212 and 222 in a lateral direction as it traverses one or more flute-forming bars or other flute-forming elements in that direction. When operated in a zero-contact mode as described above, machine-direction tension fluctuations can also be reduced or even eliminated because if the web does not contact the forming bars 212 and 222 there will be no friction between them. Thus, substantially every element of the traveling web moves in three dimensions (e.g., laterally, vertically and forward) simultaneously, while also maintaining substantially constant cross machine tension and machine-direction tension because the forming device 200 does not introduce lateral or longitudinal tension fluctuations in the traveling web even though it introduces longitudinal flutes therein to gather web width. Upon exiting the forming device 200 the width of the formed web 10*b* is adjusted to conform to or approximate the final width of a desired longitudinally-corrugated or other three-dimensional web to be made in a downstream operation, based on the lateral take-up ratio required to accommodate the final three-dimensional configuration.

Figure 8:
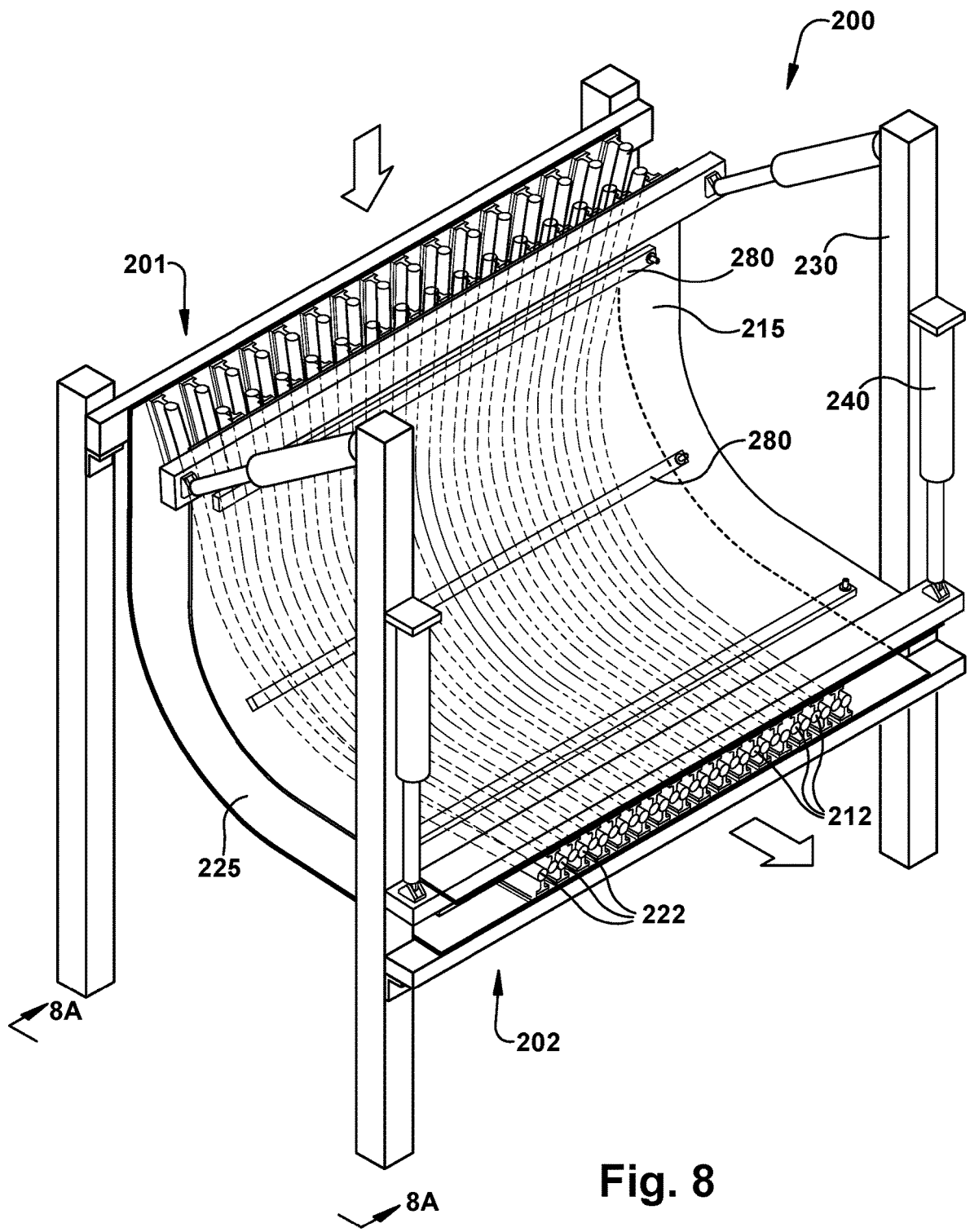
FIG. 8 illustrates an alternative embodiment of a forming device as herein disclosed, where the forming device defines an intermediate longitudinal corrugating labyrinth that follows a curved path in order effect web-course adjustment at the same while introducing intermediate corrugations to gather web width prior to downstream operations.
Figure 8A:
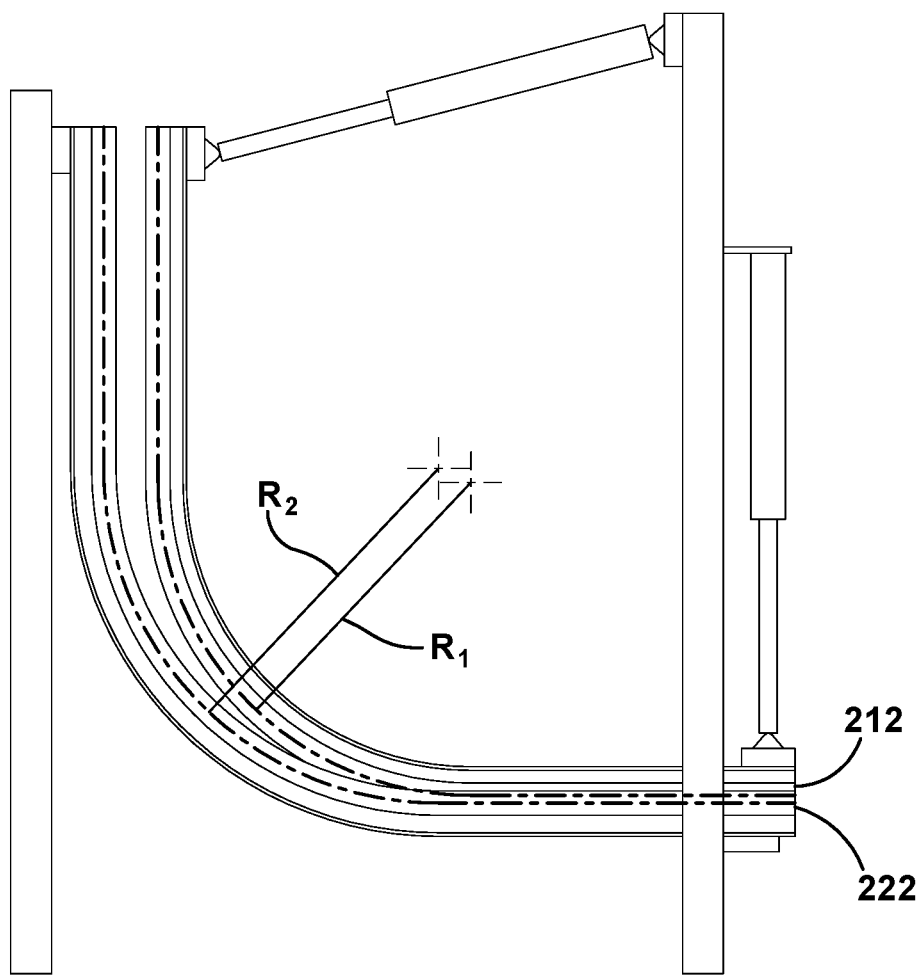
FIG. 8a is a side view of the forming device of FIG. 8, shown along line 8a-8a in FIG. 8.

FIG. 8 illustrates an alternative embodiment of a forming device 200, wherein the forming device not only gathers web width 10 but also conducts that web through a curved web pathway to adjust the course of the formed web 10*b* on exiting the forming device 200 relative to the entering web 10/10*a*. In this embodiment, the flute-forming bars 212 of the first set 210 have radiused portions that curve about an imaginary axis parallel to the cross-machine direction such that the radiused portions together define a substantially partially cylindrical arc having a first radius of curvature $R_1$ between said axis and bars 212. It is noted that the aforementioned curvature having radius $R_1$ relative to the noted imaginary axis is independent of and in addition to the convergent curvature of individual forming bars 212 in the first set 210 discussed above. That is, in this embodiment the forming bars 212 will both bend around the partially cylindrical arc noted above and gradually converge as described above to provide simultaneous course correction and web-width gathering for the traveling web. Likewise, the flute-forming bars 222 of the second set 220 have cooperating radiused portions that curve about another imaginary axis parallel to the cross-machine direction such that the radiused portions of the flute forming bars 222 similarly define a substantially partially cylindrical arc having a second radius of curvature $R_2$. And likewise, this curvature based on the radius $R_2$ is independent of and in addition to the convergent curvature of individual forming bars 222 in the second set 220 as discussed above.

The arc lengths for each of the first and second sets 210 and 220 of the forming bars 212 and 222 are selected so that the desired course adjustment of the web-travel pathway can be achieved while traversing the longitudinal fluting labyrinth 250. For example, for a 90° course correction the arc length of the sets 210 and 220 of forming bars are such that the fluting labyrinth 250 defined between them follows a course that extends π/2 radians at the desired radius of curvature. This embodiment may be desirable, for example, where it is desired to save space by feeding the initial web 10/10*b* from above the forming device 200 rather along a linear web path. As will be appreciated, other geometries and curvatures (e.g. twisting) of the forming-bar arrays 210 and 220 are possible and can be selected based on the geometry of a particular installation and the resultant desired web-travel pathway.

Corrugating Die

Figure 9A:
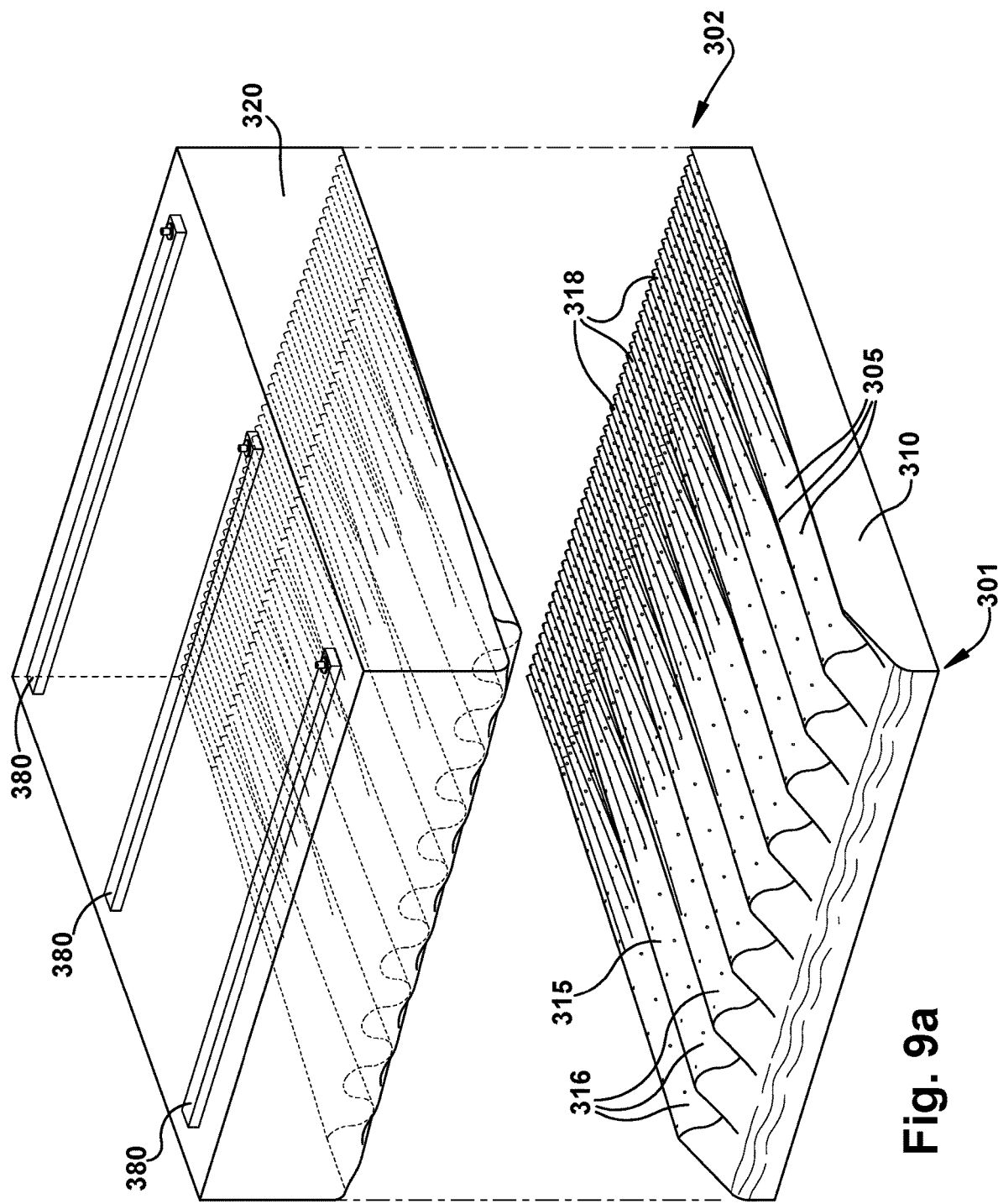
FIG. 9a is a perspective sectional view of a corrugating die as disclosed herein for converting a formed web exiting the disclosed forming device to near net shape compared to a final desired corrugated geometry.

On exiting the forming device 200 the formed web 10*b* can be fed to a corrugating die 300 as illustrated in FIG. 9*a*. The corrugating die 300 includes first and second die halves 310 and 320 and has an entry end 301 and an exit end 302 as shown. The first die half 310 has a forming surface 315 for converting the formed web 10*b* that emerges from the forming device to a near net-shaped web 10*c* having a fluted configuration that approximates the final desired corrugations of a finished web 10*d*. At or near the entry end 301 of the corrugating die 300 the first forming surface 315 has a series of large-amplitude longitudinal ribs 316 defining a lateral cross-section that has a substantially sinus-wave configuration whose frequency and amplitude substantially correspond to or approximate those of the intermediate flutes imparted to the formed web 10*b* in the forming device 200. As the forming surface 315 proceeds in the machine direction, the sinus contour of the large-amplitude ribs 316 gradually evolves into a final sinus contour (in lateral cross-section) at the exit end 302, defined by small-amplitude longitudinal ribs 318 and the alternately intermediate valleys between them. It will be appreciated that the forming surface 315 is a continuous and smooth surface, which smoothly and gradually transitions from the large-amplitude sinus contour at the entry end 301 to the small (near-net shape) amplitude sinus contour at the exit end 302. As seen in FIG. 9*a* the small-amplitude ribs 318 gradually and smoothly emerge without abrupt transitions from the large-amplitude ribs 316 and are formed in the machine direction until ultimately they entirely replace the original surface contour at the entry end 301 formed by the large-amplitude ribs 316. The ribs 318 are dimensioned so that the frequency and amplitude of the sinus contour of the forming surface 315 at the exit end 302 represents a near-net shape that approximates the final desired corrugations for the finished web 10*d*. The second die half 320 also has a forming surface configured as described above, which opposes and is the substantial complement of the forming surface 315 in the first die half 310.

Figure 9B:
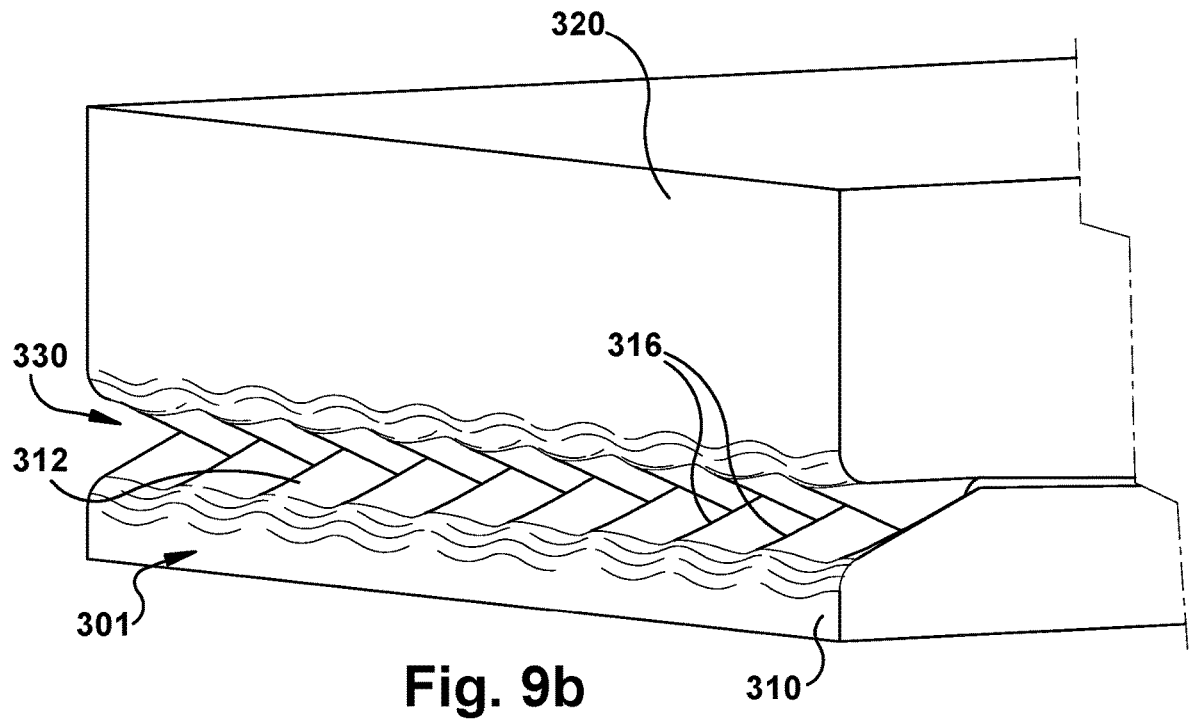
FIG. 9b is a perspective view of the corrugating die in FIG. 9a wherein the respective die halves 310 and 320 have been engaged.
Figure 9C:
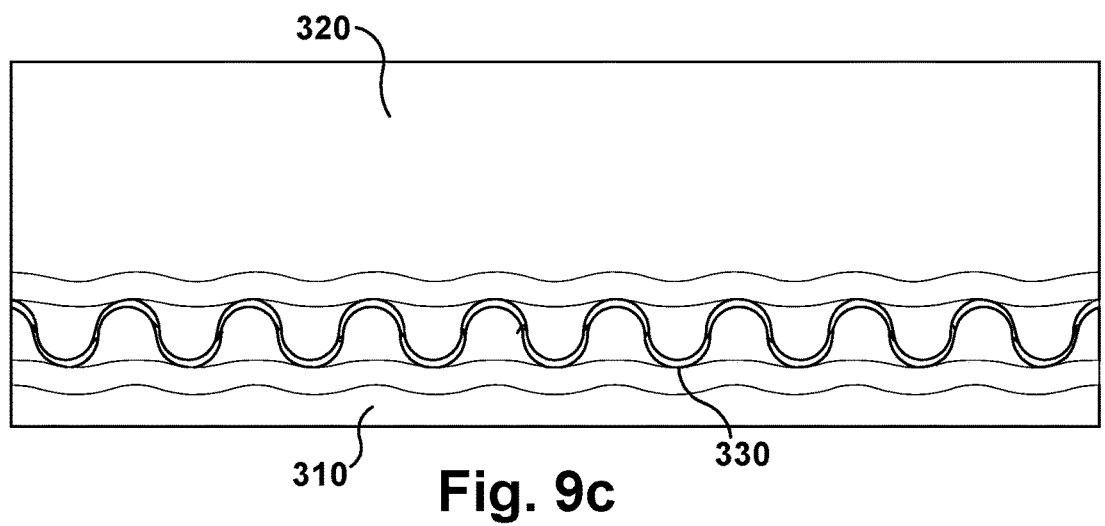
FIG. 9c is an end view of the corrugating die as shown in FIG. 9c, showing the tapered configuration of the ribs defining the initial sinus geometry of the web pathway through the corrugating die.

Referring now to FIGS. 9*b* and 9*c*, the forming surface 315 of at least one of the die halves (e.g. first die half 310 in FIG. 9*b*) has a tapered portion 312 at the entry end 301, which tapers gradually toward the forming surface of the opposite die half (half 320 in FIG. 9*b*) along the machine direction until the opposing forming surfaces are uniformly spaced apart along the machine direction. As seen in the figure, the tapered portion is composed of the large-amplitude ribs 316 discussed above, which taper toward the opposite die half (preferably at a constant slope) when viewed from the side until they reach and are interlaced with the opposing large-amplitude ribs 316 at the opposite forming surface. In this manner, the tapered portion 312 cooperates with the forming surface of the opposite die half to form a mouth 330 at the entry end of the corrugating die 300, into which the formed web 10b can be fed. The mouth 330 avoids an abrupt transition for the web 10b when entering into the corrugating space between the opposing die halves 310 and 320, and instead provides for a gradual transition. In an alternative embodiment, the respective forming surfaces of the opposing die halves can each have oppositely-tapered portions to form the mouth 330 instead of only one of the die halves having a tapered portion 312.

Figure 10:
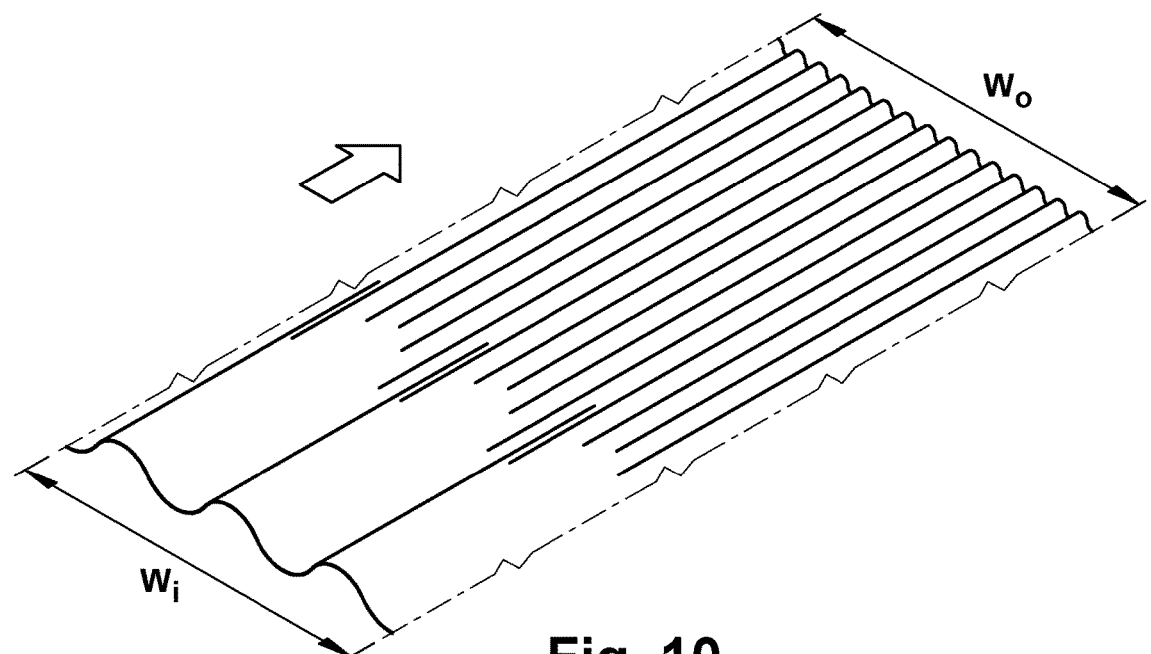
FIG. 10 is a perspective view, in section, of a portion of a traveling web as it is formed into near net shape in the corrugating die described herein, from the intermediate-corrugated web produced in the forming device.

In operation, the die halves 310 and 320 are engaged as shown in FIG. 9b and the formed web 10b enters the corrugating space between the opposing forming surfaces thereof via the mouth 330. As the web passes through the corrugating die 300, the formed web 10b from the forming device 200 is converted into a near net-shaped web 10c that approximates the final corrugated web 10d as the large-amplitude ribs 316 gradually give way to the small-amplitude ribs 318 therein. In particular, as the web progresses its shape gradually evolves from an initial sinus contour defined by the relatively large-amplitude, low-frequency intermediate-geometry flutes (corresponding to the contour of the large-amplitude ribs 316), into a final sinus contour at the exit end 302 having a relatively higher frequency and lower amplitude corresponding to the small-amplitude ribs 318. The final sinus contour of the web 10c on exiting the corrugating die 300 constitutes a near net shape for the web that approximates the final desired corrugated geometry. Preferably, the web contour smoothly and gradually transitions from the large-amplitude initial sinus contour to the small (near-net shape) amplitude sinus contour as it passes between the opposed first and second complementary forming surfaces, following the gradual and smooth transition from the interlocking large-amplitude ribs 316 therein to the interlocking small-amplitude ribs 318. This progression of the web can be seen in FIG. 10, which illustrates a portion of the web as it traverses the corrugating space between the forming surfaces 315, and is smoothly transitioned from the fluted configuration at 10b to the near-net shape at 10c. Importantly, the width of the near net-shaped web 10c is approximately the same as the formed web 10b as it enters the corrugating die 300; i.e. $w_f \approx w_o$ in FIG. 10. As a result, lateral tension forces and stresses that might otherwise be imparted to the web 10 in the corrugating die 300 (as a result of forming the near net-shaped sinus pattern therein) are substantially reduced or eliminated. Because the initial and final widths of the web through the corrugating die 300 are substantially the same, no portion of the web needs to move laterally (in the cross-machine direction) in order to form the higher-frequency, lower-amplitude flutes (at 10c) from the lower-frequency, higher-amplitude flutes (at 10b). Instead, individual elements of the web need only translate vertically as the web travels in the machine direction, and not laterally. As a result, because there is substantially no lateral movement of individual web elements the corrugating die introduces substantially no lateral tension or frictional forces or fluctuations to the web. This reduces the chances of damaging the web.

In FIG. 9a die halves 310 and 320 are illustrated separated from one another to allow visualization of the contour of the die's internal forming surfaces. But in use the die halves 310 and 320 are brought into engagement with one another as seen in FIGS. 9b and 9c and discussed above, wherein the second die half 320 has an internal forming surface that is the complement of the forming surface of the die half 310, also mentioned above. Preferably, when so engaged there is a constant or substantially constant spacing between the opposing die halves 310 and 320, and their respective and complementary forming surfaces, so that the traveling web 10 is not compressed to any significant degree as it traverses the corrugating die 300. In particular, the spacing between the opposing and complementary forming surfaces downstream of the tapered portion(s) 330 thereof preferably is constant and uniform, and preferably is at least 150% the thickness of the web that will travel therebetween, more preferably at least 175% that thickness, and most preferably at least 200% or 250% that thickness; in any event the spacing preferably is not greater than 400% that thickness. Thus the degree of drag on the traveling web can be greatly reduced compared to if the spacing between the opposed forming surfaces were selected to just correspond to the approximate thickness of the web.

Moreover, to operate the corrugating line 1000 continuously it will be necessary periodically to splice the web 10 in order to sustain a constant supply of medium material in a continuous and uninterrupted web 10. The maintenance of the aforementioned spacing between the opposing die halves will permit periodic splices in the web 10 to pass through the forming die 300 without incident, and to be formed into the near net-shaped web 10c with the rest of the continuous web. In practice, the respective die halves 310 and 320 can be mounted to frames (not shown), which will support them and maintain a relative distance between them when engaged to afford the modest degree of spacing between the opposed forming surfaces as discussed above.

To further reduce drag and the introduction of longitudinal tension fluctuations, the corrugating die halves 310 and 320 can be provided with an array of fluid ports 305 over their respective forming surfaces, through which a pressurized fluid similarly as described above can be delivered to provide a fluid cushion for supporting the web on either side. Also similarly as above, supply manifolds 380 can be distributed on each of the first and second die halves 310 and 320, connected to a fluid supply and provided in fluid communication with the fluid ports in the associated die half 310 or 320, or with respective banks of those ports in respective longitudinal zones along the machine direction. The manifolds 380 can be arranged, configured and operated analogously as described above in order to selectively supply fluid flow rates and pressures uniformly to the fluid ports in each of the first and second die halves 310 and 320, or to different longitudinal zones uniformly in the same longitudinal zone(s) in both die halves 310 and 320. In this manner, the fluid cushion can minimize or prevent frictional losses between the traveling web and the forming surfaces of the die halves 310 and 320 by reducing or even inhibiting contact between them as the web travels.

It is contemplated that corrugating dies having forming surfaces of different contours can be selected and used based on a) the particular sinus pattern of the formed web 10b to be introduced therein, and b) the final desired flute size for the finished web. Thus different corrugating dies 300 can be provided corresponding to different combinations of take-up ratio (corresponding to desired final flute size) and final web width, and can be interchanged in the corrugating line 1000 when different webs are to be made. It is contemplated, for example, that several corrugating dies 300 can be made based on standardized web sizes and flute pitches to be interchangeably installed downstream from a forming device 200 and upstream of a final corrugating apparatus 400.

Finally, it is noted that the corrugating die 300 described here is preferred in select embodiments, but it is considered optional in the corrugating line 1000. That is, while the corrugating die 300 may be desired to gradually convert the intermediate-fluted, formed web 10*b* to the near net-shaped web 10*c* that approximates a final corrugated web 10*d*, in embodiments it may be possible or desirable to simply feed the formed web 10*b* directly into a final corrugating apparatus, e.g. longitudinal corrugating rollers, to impart the final longitudinal corrugations or other three-dimensional structure therein.

Final Corrugating Apparatus

Figure 11:
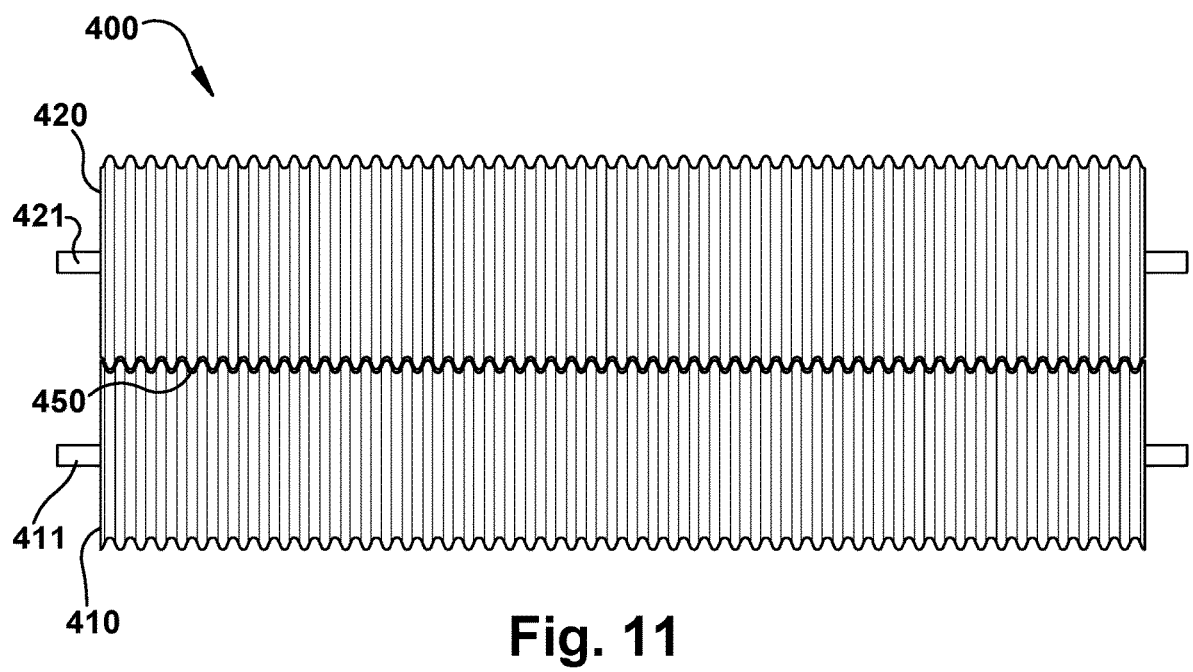
FIG. 11 is a perspective view showing longitudinal corrugating rollers engaged to define a corrugating nip therebetween for imparting longitudinal corrugations to a passing web.

On exiting the corrugating die 300 (if present) or the forming device 200, the formed or near net-shaped web 10*b* or 10*c* can be delivered to a final corrugating apparatus 400 to yield the final corrugated web 10*d* having the desired longitudinal corrugations at the desired final web width. In one embodiment the final corrugating apparatus includes a pair of longitudinal corrugating rollers 410 and 420 as seen in FIG. 11. In this embodiment, the corrugating rollers 410 and 420 are each journaled on respective rotational axes 411 and 421 that are parallel to one another and perpendicular to the machine direction when viewed from above, such that the web-travel pathway passes between the opposed rollers 410 and 420. The rollers 410 and 420 have respective and complementary sets of circumferentially extending and longitudinally distributed ribs, such that at a nip 450 between the rollers 410 and 420 the ribs of one roller extend and are received within the valleys defined between the opposing ribs on the opposite roller, and vice versa. The opposing ribs are selected so as to define between them a substantially sinus nip 450 having a contour in the lateral direction that corresponds in frequency and amplitude to the desired flutes for the longitudinally-corrugated web 4*d*.

In operation the formed web 10*b* or near net-shaped web 10*c* is fed along the machine direction into and through the nip 450 between the corrugating rollers 410 and 420. The web 10*b*/10*c* pass through the nip 450 and is compressed between the opposing rollers 410 and 420 to form and relax the web in the sinus, longitudinally-corrugated shape so that the final corrugated web 10*d* will retain that shape independently from the application of any external corrugating force or when that force is removed. Whether the web entering the corrugating nip 450 is a formed web 10*b* directly from the forming device 200 or a near net-shaped web 10*c* from a corrugating die 300, its width remains substantially the same prior to, while and after traversing the corrugating nip 450. As a result, again there are preferably no or substantially no net lateral forces (cross-machine direction) on the web as it is corrugated at the corrugating nip 450.

The finished corrugated web 10*d* can then be fed to additional units or operations for further downstream processing. For example, the corrugated web 10*d* can be delivered to a conventional single-facer as known in the art, in order to apply a liner to produce a conventional single-faced web. That single-faced web can then be fed to a double-backer to apply a second liner to the remaining exposed flute crests of the web to produce conventional double-wall corrugated board, which can then be cut and shaped in a conventional manner to make packaging material, such as boxes.

CONCLUSION

Conventionally, the friction experienced by a paper web proceeding through a longitudinal corrugating machine (as disclosed in U.S. Pat. Appl'n Pub. No. 2010/0331160) was large enough to damage the paper web. This occurred because the amount of friction experienced by the travelling web, as it was gathered inward (i.e. its width reduced to accommodate the longitudinal corrugations), increased exponentially with the number of flute-forming bars against which the paper web was required to travel in the transverse, non-machine direction. Thus existing longitudinal forming devices would apply an ever-increasing amount of friction and oscillatory and transitory lateral-tension forces to the paper web that can ultimately deform and/or destroy the end product.

Conversely, the curved (e.g. parabolic) geometry of the flute-forming bars 212 and 222 of the forming device 200 described here yield a gradual forming process that uniformly and continuously forms the initial web into an intermediate sinusoidal shape having a reduced width corresponding to the desired take-up ratio, but without introducing transient or fluctuating lateral-tension forces. Because individual web elements follow a continuous curved path along curved contour lines defined by the curved flute-forming bars (see FIG. 5), there is substantially no lateral movement in the web relative to the flute-forming bars 212,222. In other words, the curved forming bars 212,222 are designed such that each portion of the web (e.g. paper web) will follow substantially the same forming bar, or a continuously-curved contour line between adjacent forming bars 212,222, along the machine direction from the entry end 201 to the exit end 202 of the forming device 200. As a result, the traveling web preferably experiences little, if any, movement in the transverse, cross-machine direction relative to the forming bars 212,222. This means that little, if any, net friction or tension forces or associated fluctuations is/are applied to the traveling web in the forming device 200 along the transverse, non-machine direction.

Although particular embodiments of the invention have been described in detail, it will be understood that the invention is not limited correspondingly in scope, but includes all changes and modifications coming within the spirit and terms of the claims appended hereto.

What is claimed is:

1. A forming device having an entry end and an exit end spaced apart along a machine direction, the forming device comprising a plurality of flute-forming bars extending from adjacent the entry end toward the exit end, wherein the plurality of flute-forming bars are configured to gradually and uniformly introduce into a web of medium material an array of longitudinal flutes as the web travels along a web-travel pathway in the machine direction, the plurality of flute-forming bars comprising a first set of the bars and a second set of the bars, the first and second sets of flute-forming bars opposing one another and being effective to define therebetween a longitudinal fluting labyrinth.

2. The forming device of claim 1, wherein a subset of the plurality of flute-forming bars converge in a cross-machine direction toward the exit end.

3. The forming device of claim 2, wherein tangents of all of the flute-forming bars at a location adjacent the exit end are all substantially parallel along the machine direction.

4. The forming device of claim 2, each of the subset of flute-forming bars converge toward a common imaginary line that runs parallel to the machine direction.

5. The forming device of claim 1, wherein a spacing between the first and second sets of flute-forming bars is adjustable adjacent the exit end to at least partially interlace the opposing sets of flute-forming bars adjacent the exit end.

6. The forming device of claim 5, the spacing also being adjustable adjacent the entry end to thereby adjust a machine-direction location of a choke point where the opposing first and second sets of flute-forming bars begin to interlace.

7. The forming device of claim 1, the first set being a first planar array of flute-forming bars, the second set being a second planar array of flute-forming bars, wherein a first subset of flute-forming bars in the first planar array all converge with respect to a first imaginary centerline in the first planar array, and wherein a second subset of flute-forming bars in the second planar array all converge with respect to a second imaginary centerline in the second planar array.

8. The forming device of claim 7, wherein at a given location along the machine direction, all of the flute-forming bars in the first planar array are equidistant from one another and all of the flute-forming bars in the second planar array are equidistant from one another.

9. The forming device of claim 8, the first and second planar arrays being arranged such that all of the flute-forming bars from both of the arrays together are equidistant from one another in the cross-machine direction at any given machine-direction location.

10. The forming device of claim 1, wherein a curved flute-forming bar in a respective one of the sets has a degree of lateral curvature that decreases in the machine direction such that rates of lateral convergence thereof also decrease until a machine-direction location where imaginary tangents of the curved flute-forming bar in the respective set all become substantially parallel along the machine direction, the tangents remaining substantially parallel through the exit end.

11. The forming device of claim 1, a subset of the plurality of flute-forming bars having a variable-tangent configuration such that imaginary tangents to each of the subset of bars, at spaced locations along a length thereof, become successively nearer to parallel with the machine direction such that the subset of bars converge in a cross-machine direction as a result of the variable-tangent configuration as they proceed toward the exit end.

12. The forming device of claim 11, wherein tangents of all of the flute-forming bars at a location adjacent the exit end are all substantially parallel along the machine direction.

13. The forming device of claim 11, each of the subset of flute-forming bars converging toward a common imaginary line that runs parallel to the machine direction.

* * * * *